(12) United States Patent
McLoughlin et al.

(10) Patent No.: US 10,306,180 B2
(45) Date of Patent: May 28, 2019

(54) PREDICTIVE VIRTUAL REALITY CONTENT STREAMING TECHNIQUES

(71) Applicant: LiquidSky Software, Inc., New York, NY (US)

(72) Inventors: Ian McLoughlin, New York, NY (US); William J. Raduchel, Palo Alto, CA (US); Timothy Miller, Great Falls, VA (US)

(73) Assignee: LiquidSky Software, Inc., New York, NY (US)

( * ) Notice: Subject to any disclaimer, the term of this patent is extended or adjusted under 35 U.S.C. 154(b) by 0 days.

(21) Appl. No.: 15/790,738

(22) Filed: Oct. 23, 2017

(65) Prior Publication Data

US 2018/0115743 A1 Apr. 26, 2018

Related U.S. Application Data

(60) Provisional application No. 62/411,282, filed on Oct. 21, 2016.

(51) Int. Cl.

| | |
|---|---|
| *H04N 7/04* | (2006.01) |
| *G06T 15/00* | (2011.01) |
| *H04N 5/243* | (2006.01) |
| *H04N 5/14* | (2006.01) |
| *H04N 21/20* | (2011.01) |
| *H04N 13/344* | (2018.01) |
| *H04N 13/194* | (2018.01) |

(52) U.S. Cl.
CPC .............. *H04N 7/04* (2013.01); *G06T 15/005* (2013.01); *H04N 5/14* (2013.01); *H04N 5/243* (2013.01); *H04N 13/194* (2018.05); *H04N 13/344* (2018.05); *H04N 21/20* (2013.01)

(58) Field of Classification Search
CPC ............ H04N 7/04; H04N 5/14; H04N 5/243; H04N 5/04; G06T 15/005
USPC ............. 725/87, 32; 348/571, 500; 386/223; 382/107
See application file for complete search history.

(56) References Cited

U.S. PATENT DOCUMENTS

| | | | |
|---|---|---|---|
| 8,387,099 B2* | 2/2013 | Perlman | A63F 13/30 463/40 |
| 9,857,871 B2* | 1/2018 | Mallinson | G06F 3/013 |
| 10,078,917 B1* | 9/2018 | Gaeta | G06T 19/006 |

(Continued)

*Primary Examiner* — Paulos M Natnael
*Assistant Examiner* — Sean N. Haiem
(74) *Attorney, Agent, or Firm* — Fish & Richardson P.C.

(57) ABSTRACT

In some implementations, a system is capable of reducing latencies associated with streaming virtual reality (VR) content over a virtualized computing environment. A first frame of VR content provided to a computing device is identified. A second frame of the VR content to be rendered for display on the computing device is also identified. Input data associated with the VR content streamed on the computing device is obtained. A collection of partial frames associated with the first frame is determined. One or more partial frames is selected from among the collection of partial frames that are associated with the first frame. An instruction for rendering the second frame is generated. The instruction includes at least, for each of the selected partial frames, a representation of the difference between a corresponding portion of the first frame and a particular partial frame. The instruction is provided to the computing device.

13 Claims, 12 Drawing Sheets

(56) References Cited

U.S. PATENT DOCUMENTS

| | | | |
|---|---|---|---|
| 2008/0260209 A1* | 10/2008 | Yabushita | G06K 9/00026 382/107 |
| 2015/0243085 A1* | 8/2015 | Newhouse | G06T 19/006 345/633 |
| 2016/0191893 A1* | 6/2016 | Gewickey | H04N 13/025 386/223 |
| 2017/0064154 A1* | 3/2017 | Tseng | H04N 5/04 |
| 2017/0068312 A1* | 3/2017 | Mallinson | G06F 3/013 |
| 2017/0102766 A1* | 4/2017 | Hayashida | G06F 3/147 |
| 2017/0115488 A1* | 4/2017 | Ambrus | G02B 27/0172 |
| 2017/0178408 A1* | 6/2017 | Bavor, Jr. | G06F 3/013 |
| 2017/0244951 A1* | 8/2017 | Ha | G06T 19/006 |
| 2017/0249745 A1* | 8/2017 | Fiala | G06T 7/13 |
| 2017/0295309 A1* | 10/2017 | Cabral | H04N 5/2352 |
| 2017/0302972 A1* | 10/2017 | Zhang | H04N 21/2343 |
| 2018/0061119 A1* | 3/2018 | Pharr | G06T 15/205 |
| 2018/0081429 A1* | 3/2018 | Akenine-Moller | G06F 3/011 |

\* cited by examiner

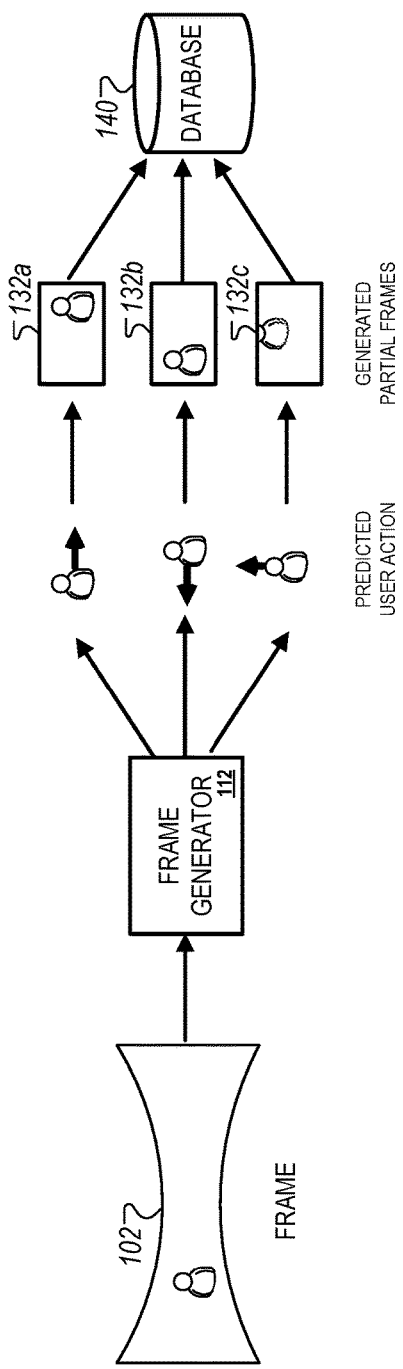
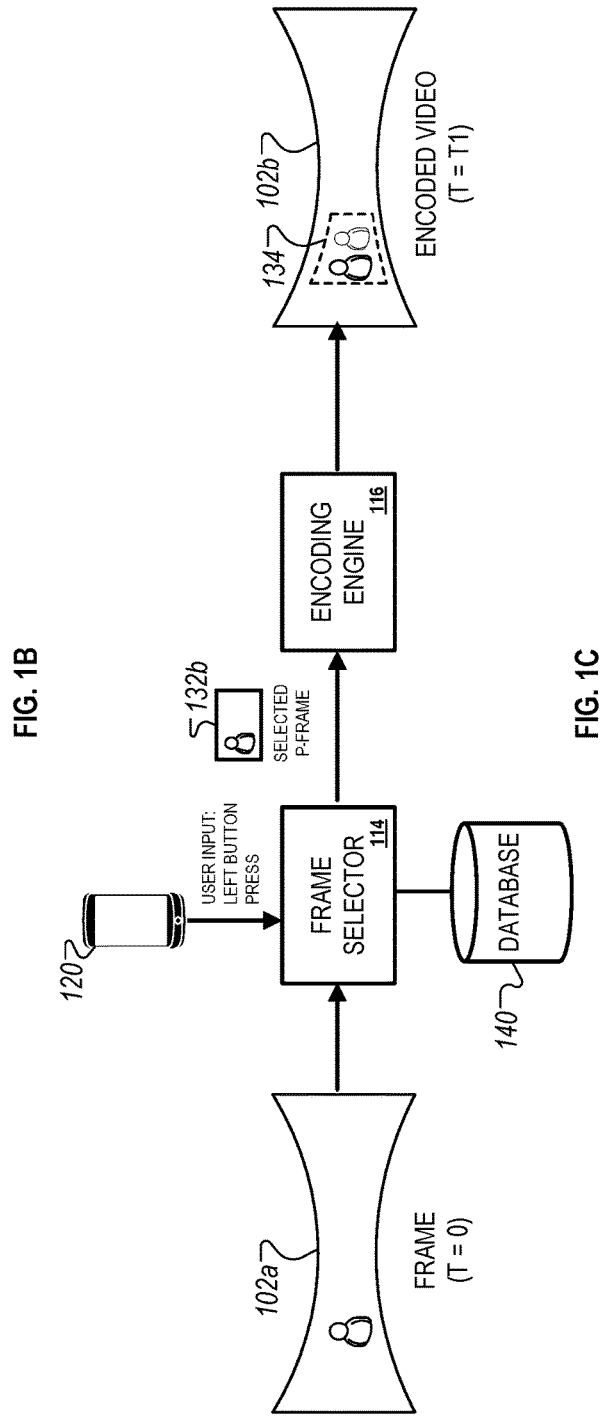
FIG. 1B
FIG. 1C

| FRAME REGION | CONSISTENCY SCORE | PIXEL RANGE |
|---|---|---|
| 602A | 0.99 | $(X_1,Y_1) - (X'_1, Y'_1)$ |
| 602B | 0.60 | $(X_2,Y_2) - (X'_2, Y'_2)$ |
| 602C | 0.15 | $(X_3,Y_3) - (X'_3, Y'_3)$ |

PREDICTIVE VIRTUAL REALITY CONTENT STREAMING TECHNIQUES

CROSS-REFERENCE TO RELATED APPLICATION

This application claims priority to U.S. Application Ser. No. 62/411,282, filed on Oct. 21, 2016, the contents of which are incorporated by reference in its entirety.

TECHNICAL FIELD

The present specification generally relates to computer systems, and more particularly relates to virtual reality gaming.

BACKGROUND

In application streaming, a host system may execute an application and stream video rendered for the application to a remote computing device used by a user. The user may then interact with the application based on the video streamed to the computing device. The video generated by the host system may be captured on the host system as frames, encoded as video bit-streams, and sent to the client for decoding and playback.

To maintain high interactivity, the reduction of latency between content generation at the host system and content playback at the client may be desired. Latency in application streaming may lead to unsatisfactory user experiences. For example, latency may cause an application to seem unresponsive or cause lag. Latency may be due to in large part to three factors, host system processing time, client processing time, and network transport time. Host system processing time and client processing time may be largely dependent on the computational resources available and may not vary much across frames. However, network transport time may increase as an encoded bit-stream size of a frame increases for a given network bandwidth.

SUMMARY

Virtual reality (VR) content, such as 360-degree videos or immersive three-dimensional video games, are typically run on computing devices that have extensive processing and graphics capabilities that are often required to display the VR content. However, because computing devices with limited graphics or processing capabilities, such as smartphones, tablet computing devices, ultra-portable laptop computing devices, are often unable to run high-fidelity VR content, such devices are often used to locally run low-fidelity VR content, e.g., VR games with lower quality graphics or lower resolution 360-degree videos.

Many content distribution systems often use network-based streaming technologies to allow a computing device with limited hardware capabilities to run graphically intensive content. For example, content can be streamed to a computing device over a virtualized computing network using a network connection to a host system that locally runs the content. However, such techniques often still experience significant latencies when streaming VR content. As a result, many content distribution systems are often unable to provide the immersive user experience that is often desired for VR content. For example, streaming performance for VR content often demands lower latencies compared to streaming of two-dimensional content. Specifically, because a user is able to provide different types of inputs, e.g., head movements, three-dimensional object interaction, etc., within a three-dimensional virtual environment, input latencies are often more acutely perceived by a user compared to interaction with two-dimensional content. As such, traditional streaming technologies for two-dimensional content are often incapable of achieving the performance needed to sufficiently stream VR content over a virtualized computing network.

To address these and other limitations, a system is capable of reducing latencies associated with streaming VR content over a virtualized computing environment. For instance, the system renders and/or encodes frames of the VR content using partial frames to reduce the amount of network bandwidth that is required to exchange stream data over a network. As a general example, instead of rendering and/or encoding each individual frame of the VR content and exchanging the frames between the host system and the computing device, the system uses predicted partial frames to render and/or encode changes between individual frames. Because the amount of data that is exchanged between the host system and the computing device over the network can potentially be reduced, the overall network bandwidth associated with streaming VR content is also possibly reduced, thereby resulting in possible reductions latencies associated with streaming VR content.

In some implementations, the system generates partial frames to represent predicted changes between frames of VR content. The system uses the partial frames to selectively process specified regions of a frame that are predicted to change in a subsequent frame and not process other regions of the frame that are not predicted to change in a subsequent frame. In this manner, instead of rendering and/or encoding each individual frame of VR content, the system uses the partial frames to predict a frame without rendering or encoding a whole frame. As an example, instead of rendering and encoding two frames, the system identifies a representation of a difference between the two frames and then uses one or more pre-rendered partial frames that coincide with the representation to generate the second frame based on partially modifying the first frame. By identifying and processing only regions of frames that are most likely to change between frames within a frame sequence, the system uses the partial frames reduce the amount of data that is transmitted over the network.

Techniques described herein may provide one or more of the following technical advantages. Other advantages are discussed throughout the detailed description. The present technology provides a single architecture through which VR content can be streamed to a computing device from a host system over a virtualized computing environment with reduced latency compared to traditional streaming technologies.

In one general aspect, a method includes the operations of: identifying, by a server system, (i) a first frame of virtual reality content that has been provided to a computing device, and (ii) a second frame of the virtual reality content to be rendered for display on the computing device; obtaining, by the server system, input data associated with the virtual reality content streamed on the computing device; determining, by the server system, a collection of partial frames that is associated with the first frame; selecting, by the server system and based at least on the obtained input data, one or more partial frames of the virtual reality content from among the collection of partial frames that are associated with the first frame; and generating, by the server system, an instruction for rendering the second frame, the instruction including at least, for each of the selected partial frames, a representation of the difference between a corresponding portion of the first frame and a particular partial frame; and providing, by the server system, the instruction to the computing device.

One or more implementations can include the following optional features. For example, in some implementations, the collection of partial frames is stored on the server system. In such implementations, the instruction further includes (i) the selected partial frames, and (ii) one or more commands that, when the instruction is received by the computing device, causing the computing device to combine the first frame and the selected partial frames using the representations to render the second frame.

In some implementations, the collection of partial frames is stored on the computing device. In such implementations, the instruction further includes, (i) metadata that identifies the selected partial frames, and (ii) one or more commands that, when the instruction is received by the computing device, causes the computing device to: obtain the selected partial frames from storage using the metadata, and combine the first frame and the selected partial frames using the representations to render the second frame.

In some implementations, selecting one or more partial frames from among the collection of partial frames includes: computing prioritization scores for partial frames included in the collection of partial frames; and selecting partial frames that have a prioritization score that satisfies a predetermined threshold.

In some implementations, each partial frame represents a predicted change to a portion of the first frame. In such implementations, each prioritization score reflects a respective likelihood that a predicted change represented by a corresponding partial frame will occur within the second frame.

In some implementations, the obtained user input data identifies a type of input provided by a user of the computing device. In such implementations, selecting one or more partial frames from among a collection of partial frames comprises selecting one or more partial frames that each represent a predicted change corresponding to the type of input provided by the user of the computing device.

In some implementations, the obtained user input data identifies a display element of the first frame. In such implementations, selecting one or more partial frames from among a collection of partial frames includes selecting one or more partial frames that are assigned to the display element.

In some implementations, the virtual reality content includes a two-dimensional video composed of rectangular pixels. Alternatively, in other implementations, the virtual reality content includes a three-dimensional video composed of non-rectangular pixels.

In some implementations, the method includes the operation of encoding, by the server system, the one or more selected partial frames and to generate encoded partial frames. In such implementations, the instruction further includes (i) the encoded partial frames, and (ii) one or more commands that, when the instruction is received by the computing device, cause the computing device to combine the encoded partial frames and the first frame using the representations to render the second frame.

In some implementations, the collection of partial frames includes at least one of (i) partial frames representing portions of frames of the virtual reality content previously provided to the computing device, (ii) partial frames representing portions of frames of the virtual reality content previously provided to other computing devices that have accessed the virtual reality content, or (iii) partial frames representing portions of frames of the virtual reality content not previously provided to the computing device but are predicted to likely to be subsequently displayed on the computing device.

In some implementations, determining a collection of partial frames that is associated with the first frame includes: obtaining data indicating a particular sequence of frames that were previously provided to the computing device; identifying changes between consecutive frames within the particular sequence of frames; generating partial frames representing regions of frames corresponding to the identified changes; and storing the generated partial frames.

In some implementations, determining a collection of partial frames that is associated with the first frame includes: determining a set of possible user actions that can be performed while accessing the virtual reality content on the computing device; identifying, for each possible action within the set of possible user actions, an expected change to a particular region of the first frame; and generating partial frames for the expected changes to the particular regions of the first frame.

Other versions include corresponding systems, and computer programs, configured to perform the actions of the methods encoded on computer storage devices.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

FIG. 1B illustrates an example of a technique for generating predicted partial frames.

FIG. 1C illustrates an example of a technique for encoding VR content using predicted partial frames.

In the drawings, like reference numbers represent corresponding parts throughout.

DETAILED DESCRIPTION

Figure 1A:
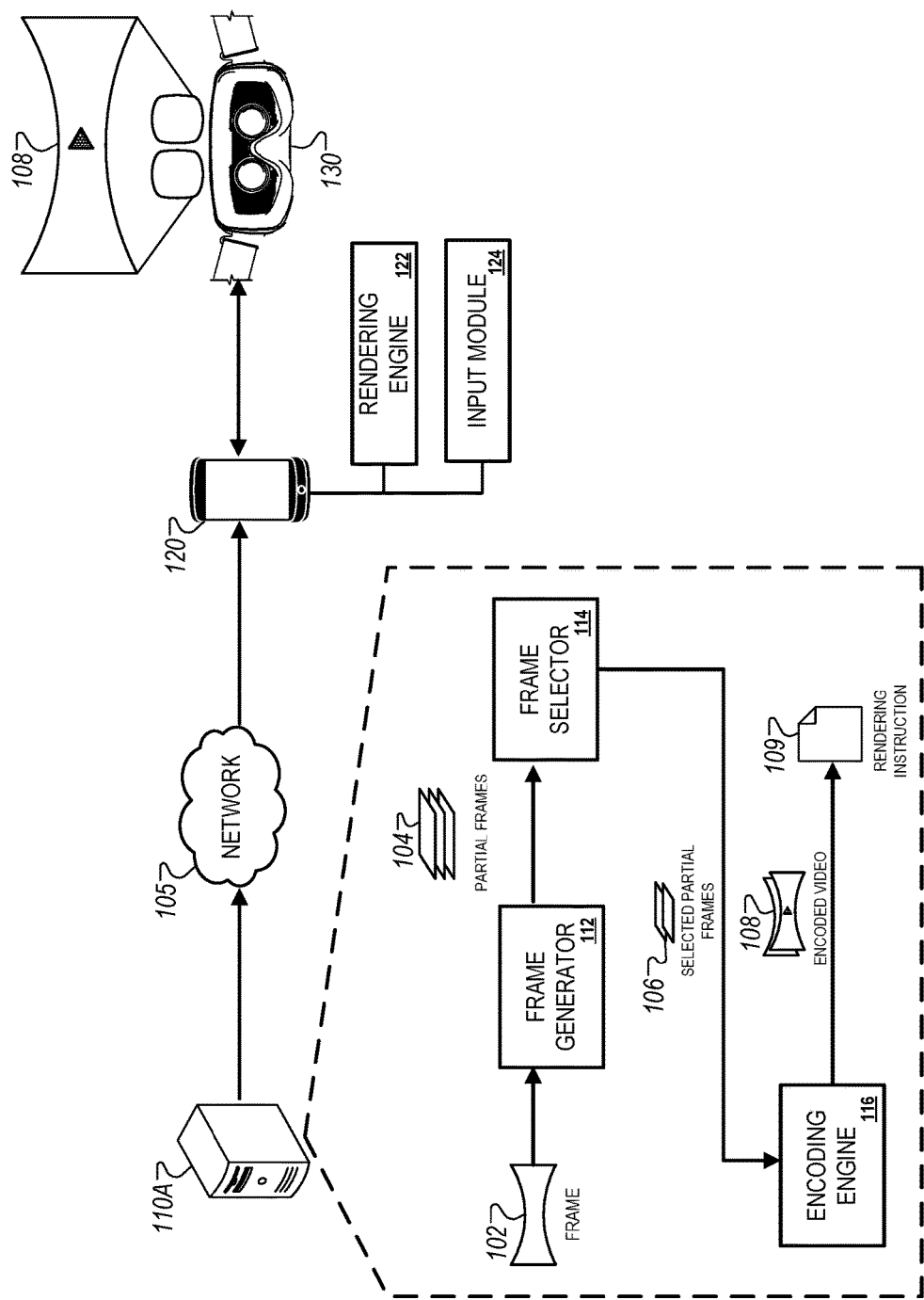
FIG. 1A illustrates an example of a technique for storing partial frames used to encode a VR content.

In general, this specification describes systems and techniques for reducing latencies associated with streaming VR content over a virtualized computing environment between a host system that locally runs the VR content and a computing device that remotely accesses the VR content. For instance, the system renders and/or encodes frames of the VR content using partial frames to reduce the amount of network bandwidth that is required to exchange stream data over a network. As a general example, instead of rendering and/or encoding each individual frame of the VR content and exchanging the frames between the host system and the computing device, the system uses predicted partial frames to render and/or encode changes between individual frames. Because the amount of data that is exchanged between the host system and the computing device over the network can potentially be reduced, the overall network bandwidth associated with streaming VR content is also possibly reduced, thereby resulting in possible reductions latencies associated with streaming VR content.

As described herein, "virtual reality content" or "VR content" refers to any type of digital data, e.g., information stored on digital or analog storage in specific format, that is digitally broadcast, streamed, or contained in computer files for a virtual reality application. In some instances, "VR content" includes passive content such as video, audio, or images that are displayed or otherwise provided to a user for viewing and/or listening. In such examples, a user provides input to access the "VR content" as a part of a multimedia experience. In other instances, "VR content" includes interactive content such as games, interactive video, audio, or images, that adjust the display and/or playback of content based on processing input provided by a user. For example, the "VR content" can be a 360-degree video stream of a game that allows a user to turn his/her head to adjust the field of view displayed to the user at any one instance, e.g., a 100-degree field of view of a 360-degree video stream.

Additionally, "virtual reality content" can refer to video of different formats such as a two dimensional (2D) content composed of square or rectangular pixels, or alternatively, three-dimensional (3D) content composed of non-rectangular, e.g., circular, pixels. For example, "virtual reality content" that is 3D content can include video of different formats such as side-by-side (SBS) 3D video, anaglyph 3D video, or top/bottom 3D video.

As described herein, a "partial frame" refers to a portion of a full frame, e.g., a subset of pixels from the pixels that compose a full frame. In some instances, a "partial frame" includes a collection of pixels, e.g., a rectangular array of pixels from a larger array of pixels of the full frame. In other instances, a "partial frame" is represented as an array of pixels of an arbitrary shape, e.g., circle, triangle, based on designated objects within the full frame. For example, a "partial frame" for a "crosshair object" within a frame for a first person shooting game are the pixels that collectively represent the "crosshair object." In this regard, a shape of a "partial frame" can be dynamically determined based on graphical elements and/or objects that are present within the full frame. A "partial frame" can also represent changes to pixels (i.e. positive and/or negative numbers that are added to color model values or other representations of pixel colors). For example, a "partial frame" can represent changes to RGB or YUV pixel values.

Additionally, individual "partial frames" can be associated with one another to generate partial video segments. A partial video segment can represent, for example, movement of a graphical element that is displayed within VR content, or a change to an appearance of a graphical element. As discussed below, the system described herein is capable of generating a partial video segment to represent a predicted change in the display of the VR content. The predicted change can be based on various factors, including user input provided by the user. For example, if the system determines, based on received user input data, that a user is likely to move a "crosshair object" toward the left side of a display of the VR content, then a stored partial video segment that represents this change can be selected and rendered along with the VR content. In other instances, a partial video segment can represent a previously rendered adjustment to display of the VR content. In such instances, the partial video segment is generated when the system first renders the adjustment, and then stores the partial video segment for display when the same (or similar) adjustment is subsequently displayed. For example, a partial video segment can be generated for the visual change to a menu item after user selection such that during a subsequent streaming session, the partial video segment is rendered to represent the selection of the same menu item (at a later time point).

As described herein, "real-time" refers to information or data that is collected and/or processed with minimal delay after the occurrence of a specified event, condition, or trigger. For instance, "real-time data" refers to data, e.g., application data, configuration data, stream data, user input data, etc., that is processed with minimal delay after a computing device collects or senses the data. The minimal delay in collecting and processing the collected data is based on a sampling rate or monitoring frequency of the computing device, and a time delay associated with processing the collected data and transmitting the processed data over a network. As an example, a configuration server can collect data in real-time from a computing device running a local application that provides access to VR content, and a host system that runs an instance of the VR content that is accessed on the computing device through a video streaming application. In this example, the configuration server can process user input data from the computing device, and stream data generated by the host system in real-time. In some instances, the configuration server can dynamically adjust the stream data provided to the computing device in real-time in response to processing user input data collected on the computing device. For example, in response to receiving a user input indicating a transition between virtualized applications accessed through the local application, the configuration server can adjust the communications between the computing device and host systems within a host system network.

As described herein, a "local application" refers to an application that physically runs locally on a computing device. For example, a local application can be configured to run on a computing device and provide access to a virtualized computing environment through one or more host systems within a host system network. The local application can generate a display that visualizes VR content is that is running on a host system and streamed to the computing device via a network-based connection.

As described herein, a "host system" refers to a server system that includes physical computing hardware that runs a hypervisor and one or more virtual machines. For example, a host system can refer to a server system that is configured to operate within a distributed network of multiple host systems. The distributed network, which is referred to herein as a "host system network" can be used to, for instance, share or migrate network and/or computing resources amongst multiple host systems. As discussed below, host systems within the host system network can be configured to run applications that running on incompatible platforms.

As described herein, a "hypervisor" refers to server software that manages and runs one or more host systems as virtual machines. The hypervisor enables the host systems to run operating systems that can be different from the operating system running on a computing device that accesses the virtual machines.

As described herein, a "virtualized computing environment" refers to an operating system with applications that can be remotely run and utilized by a user through a local application. The virtual computing environment can be provided on a computing device to allow a user of the computing device to perceive applications that are remotely run through the virtual computing environment as being substantially similar to applications running locally on the computing device through an actual computing environment. As discussed below, a virtualized computing environment can be provisioned by establishing a network-based communication between a computing device and a host system running a virtual machine. In this example, the computing device can run a local application that provides remote access to one or more virtualized applications running on the host system within a virtualized computing environment. As discussed below, the virtualized computing environment can be utilized to stream VR content that is running using the hardware of the host system and is provided for remote display on the computing device and/or an associated HMD.

As described herein, a "virtualized application" refers to an application that runs locally on a host system and accessed and/or controlled remotely over a network through a local application running on a computing device. For example, a virtualized application can run VR content that is visualized through the local application to provide the illusion that the VR content is running locally on the computing device.

FIG. 1A illustrates an example of a technique for using stored predicted partial images frames to encode changes to the display of VR content to reduce latencies associated with streaming VR content over a network.

In general, the example depicted in FIG. 1A employs various video processing and encoding techniques to reduce latency associated with displaying VR content that is transmitted over a network. The techniques described herein can be used to enable a computing device 120, and/or an associated head-mounted device (HMD) 130, to view VR content that is running locally on the host system 110A. The techniques discussed below can be executed fully on the host system 110A and/or a combination of the host system 110A and the computing device 120, as discussed below. For example, as discussed below, in some implementations, the encoding engine 116 can be a local component of the computing device 120 such that partial frame selection is performed on the host system 110A and video encoding and rendering are performed locally on the computing device 120.

As described throughout, the VR content is generated using hardware of the host system 110A such that the computing device 120 may receive the content for viewing over a network. The VR content can be displayed on the computing device 120 through a local application such as a video application that accesses a video stream of the VR content over the network 105 from the host system 110A. In some instances, the VR content can be displayed on the computing device 120 as a stream of content that is remotely rendered and encoded on the host system 110A.

Referring initially to the components depicted, the host system 110A can be a host system within a host system network, e.g., host system network 110 depicted in FIG. 2 and described below. The host system 110A can represent any type of computer system, e.g., a network server, a media server, a home network server, etc., that are capable of performing network-enabled functions such as hosting a set of shared resources for remotely streaming a virtual instance of an application (referred throughout as a "visualized application").

The computing device 120 can be any type of network-enabled electronic device that is capable of rendering a video stream received over the network 105. The computing device 120 can be an electronic device with limited hardware capabilities, e.g., a device without a dedicated graphics processing unit (GPU). For example, the computing device 120 can be a smartphone, a tablet computing device, an ultra-portable laptop computing device, or a non-gaming desktop computing device. In each of these examples, the computing device 120 can include hardware capabilities that allow streaming video content received from the host system 110A over the network 105 with minimal graphics processing capabilities.

In the example depicted in FIG. 1A, VR content is provided for output on the computing device 120 and visualized through lenses of the HMD 130 as encoded video 108. In this example, the screen of the computing device 120 can be attached or otherwise configured to the HMD 130 so that, when the HMD 130 is worn by a user, the display of the computing device 120 is shown to the user through the stereoscopic lens of the HMD 130. In some other implementations, the HMD 130 can be an electronic device with a dedicated display that outputs the encoded video 108. In such implementations, the computing device 120 can be, for example, a desktop computing device that provides a video output to the dedicated display of the HMD 130.

As shown in the example of FIG. 1A, the host system 110A initially identifies a frame 102 that represents an entire field of view of VR content that is viewable to the user, e.g., a 360-degree field of video of a 360-degree video. The frame 102 includes a display portion that is viewable by a user at any one instance, and a non-display portion is that is not viewable by the user. The size of the display portion can be based on the field-of-view provided by the HMD 130 when VR content is provided to the user. For example, a HMD 130 that allows a 90-degree field of view permits a user to view a portion of the frame 102 that represents a 90-degrees field of view of a 360-degree video.

In some implementations, the HMD 130 can be configured to monitor head movement using accelerometers that detect translation and rotation in more directions (i.e. having directions of greatest sensitivity be oriented at angular increments smaller than 45 degrees). In some instances, the HMD 130 can include different types of accelerometers with different response characteristics, and different types of sensing elements. For example, the HMD 130 can include an accelerometer, gyroscope, and magnetometer, to augment the ones in the smartphone. Additionally, or alternatively, the HMD 130 can also include sensors that enable eye tracking. In such instances, detected head motion, eye motion, or a combination thereof, can be used to anticipate user motion (i.e., a type of user input) that is then used to predict partial frames in a similar manner as discussed below with respect to FIGS. 1B and 1C.

In the context of VR content, the frame 102 can represent a static image of a 360-degree video where the user can adjust his/her virtual field of view by moving his/her head within the HMD 130. In some instances, the frame 102 can represent portions of the VR content that are not substantially changed between subsequent frames. For example, the frame 102 can represent a background texture of a video that remains unchanged during a transition in which only the foreground is changed. In this example, because the background texture remains the same, the system can update only the foreground region of the video stream to reduce the network bandwidth associated with generating an updated image corresponding to the change.

Once a frame 102 is identified for a VR content, a frame generator 112 may generate partial frames 104 corresponding to a set of predicted changes within the VR content given the present field of view represented by the frame 102. For example, during a streaming session of video game content, the partial frames 104 can represent a set of possible changes in specified regions of the field of view due to a movement of a character within the field of view of the frame 102. In this example, the partial frames 104 can represent specified regions of the frame 102 that are adjusted in a subsequent frame within a frame sequence. In other examples, the partial frames 104 can represent portions of the field of view that are updated due to graphical effects of the game, e.g., movement of objects due to environmental effects, light rays reflecting off objects that are based on the user's current field of view, etc.

After generating the predicted partial frames 104, the frame generator 112 may temporarily store the generated frames in a database for easy access during a subsequent rendering operation. More detailed descriptions related to the generation of the partial frames 104 are provided below with respect to FIG. 1B.

In some implementations, the set of partial frames 104 may be time-lapse video segments representing a corresponding change within a particular region of the frame 102 as a result of a specified user input as described above. For example, if the VR content is for a chess match game in which the user selects a move for a chess piece at turn, then each of the partial frames 104 can represent a particular move that the user can make during a turn. In this example, a particular partial frame only includes a video segment representing an animation for a corresponding chess piece but not the portions of the chessboard where other chess pieces remain stationary.

During an active streaming session, e.g., a time point in the VR content where there are significant frame-by-frame updates, a frame selector 114 selects one or more partial frames 106 from among the partial frames 104 stored in a database. The selection can be based on user input data received from the computing device 120 through an input module 124. As an example, the particular partial frames that represent changes between the frame 102 and a subsequent frame can be selected for processing by an encoding engine 116. In some instances, this is accomplished by storing the set of partial frames 104 within a hash table that associates each predicted partial frame with a hash code for a particular type of user input. In such instances, identified hash codes for user input received on the computing device 120 can then be used to select the partial frames stored within the database. The selected frames 106, including the frame 102 and the selected partial frames, are then transmitted to the encoding engine 116 for processing. More particular descriptions related to the selection of partial frames are provided below with respect to FIG. 1C.

In some implementations, the frame selector 114 can use different matching criteria to select the partial selected frames 106 from the partial frames 104 that are stored in a database. The matching criteria can specify image attributes for regions of a frame that follows the frame 102 and is to be subsequently displayed on the computing device 120. The frame selector 114 can use the specified image attributes to identify predicted frames within the partial frames 104 that satisfies a threshold similarity level. For example, a partial frame that can satisfy the threshold similarity level if it matches the specified image attributes under some transformation, such as scaling or rotation.

In some instances, to reduce the computational resources associated with selecting partial frames from the set of partial frames 104, the frame selector 114 can use the presence of distinctive features within the partial frames to reduce the number searches needed to be run within the set of partial frames 104. In other instances, the frame selector 114 can apply a "fitness function" that determines a potential match if a partial frame is close enough to a desired region (although not a perfect match). The fitness function can be used to select perceptually similar partial frames that may otherwise be different from the desired partial frame as a basis to save computational and network bandwidth.

In the example depicted in FIG. 1A, the encoding engine 116 is a video encoder of the host system 110A that encodes the selected partial frames 106 for output to the computing device 120 as encoded video 108. The encoding engine 116 can be configured to encode a partial frame using a video codec, e.g., MPEG-4, DivX Pro, Xvid, or x264. The encoding engine 116 may also generate a rendering instruction 109 that specifies the combination of the encoded video 108 for the selected frames 106 into the frame 102. For example, the rendering instruction 109 may indicate a coordinate location of each rendered video within the field of view of the frame 102.

In some instances, the rendering instruction 109 can also specify a representation of a difference between the input frame 102 and a subsequent field of view of the VR media content once the encoded video 108 has been combined with the frame 102 on the computing device 120. In some instances, the encoding engine can further process the encoded video 108 to ensure that there are no perceptual discontinuities on boundaries where partial frames inserted and/or combined with a region a larger frame such as the frame 102, for example, using a soft threshold. For encoding, pixel differences along the gradient would be attenuated between the true differences and zero.

In the example depicted in FIG. 1A, the host system 110A then transmits the encoded video 108 and the rendering instruction 109 to the computing device 120 over the network 105. The rendering engine 122 of the computing device 120 applies the rendering instructions 109 to incorporate the encoded video 108 into the input frame 102 that is presently displayed on the computing device 120. For example, each encoded video 108 can be replace a corresponding portion of the input frame 102 such that the replacement represents a substantially similar change between the original input frame 102 and the rendered output of the video render 122. In this regard, the computing device 120 can provide a video output that is substantially similar to an unmodified VR content, but is constructed using only encoded video corresponding to the partial frames (as opposed to the entire field of view of the frame 102).

The video rendered by the rendering engine 122 can then be provided for output on the screen of the computing device as a stereoscopic image for viewing through the HMD 130.

In some implementations, the encoding engine 116 may additionally or alternatively run on the computing device 120 instead of the host system 110A. In such implementations, instead of generating the encoded video 108 for the selected partial frames 106, the host system 110A may instead provide the selected partial frames 106 for output to the computing device 120 over the network 105. In such implementations, the selected partial frames 106 may be transmitted to the computing device 120 in an un-encoded format to, for example, preserve image quality while also reducing potential latency associated with the VR content by transmitting only partial frames over the network 105 as opposed to frames including the entire field of view. In some implementations, a combination of techniques can be employed to dynamically adjust between encoding techniques being performed between the host system 110A and the computing device 120. For example, if the network 105 experiences significant variability in connectivity, then encoding operations may be adjusted to reduce latency while the user is participating in an active streaming session.

In some implementations, the rendering engine 122 can be configured to apply some corrections when combining the encoded video 108 to generate a fully-assembled frame that is provided for output on the computing device 120. As described throughout, "assembly" refers to constructing entire frames by assembling portions of partial frames and/or combining partial frames with other frames. The corrections can be applied to maximize the quality of the fully-assembled frames. For example, one form of correction is to supply additional partial frames that are identified to be missing from the computing device 120. Another form of correction is to provide a full-frame sized frame that represents the discrepancies between the assembled frame and the frame as it is rendered on the host system 110A. The frame assembled by the rendering engine 122 and the frame rendered on the host system 110A can be combined to reduce fully or partially correct these discrepancies based on what is perceivable to the user. For example, discrepancies that are clearly perceivable by the user may be corrected, while discrepancies that are not perceived by the user may not be corrected. The correction can be performed in manner so that compression artifacts do not accumulate.

In some implementations, the host system 110A conserves and/or saves network bandwidth by taking advantage of the fact that VR content includes stereo video with two very similar images. In such implementations, the host system 110A constructs the frames for each stereo video in a substantially similar manner using the same stored partial frames. For example, the partial frames 104 can include alternative partial frames for each stereo frame. As an example, a partial frame representing a view point provided to a frame for the left eye can be computed mostly from a prior frame for the right eye using a transformation. A subsequent frame for the right eye can then be computing mostly from the same partial frame.

FIG. 1B illustrates an example of a technique for generating predicted partial frames. As described above, the frame generator 112 generates a set of predicted partial frames corresponding a set of possible user actions relative to a current position associated with the static frame 102. In the context of gaming, user inputs can include directional movements to a character's location, e.g., left, right, forward, backward motion, or specified actions to be performed by the character, e.g., shooting a weapon, striking an enemy within range, etc. In some instances, the set of predicted partial frames an also include partial frames for graphics effects applied by a gaming engine, e.g., shadows, lighting, reflections, etc., that cause objects to change within a frame sequence.

The number of predicted partial frames generated by the frame generator 112 can vary based on the network capabilities of the network that connects the host system 110A and the computing device 120. For example, the frame generator 112 may compute a larger number of predicted partial frames for a larger number of predicted user actions based on a larger available network bandwidth compared to a network with more restrictive bandwidth requirements. In addition, in instances where the frame generator 112 generates partial frames for less than all user actions possible, the frame generator 112 may prioritize certain actions that are more likely to occur relative to other less probable user actions. For example, directional movements to a character's location can be prioritized over special attacks to be performed by the character due to the increased frequency of character movements relative to the use of special attacks within the game. In some instances, common animations can have relevant partial frames pre-loaded, such as what a bow looks like in the player's hand when the string is being pulled back or what a sword swipe looks like.

In some instances, the frame generator 112 may use various machine learning and/or other statistical classifier techniques to identify the most likely user inputs in certain scenarios and/or locations of a game based on prior inputs submitted by the user or other users when in the same scenario and/or locations of the game. In this regard, the frame generator 112 may determine a subset of user actions that are most likely to be used by the user and intelligently use network resources to generate the predicted partial frames corresponding to the most likely user actions.

In the example illustrated in FIG. 1B, the frame generator 112 generates three partial frames 132a, 132b, and 132c that each correspond to a particular action that is predicted to be performed by the user on the computing device 120. For instance, the partial frame 132a corresponds to a predicted user input to move a character that is present within the input frame 102 to a right side of the screen. In addition, the partial frame 132b corresponds to a predicted user input to move the character to the left side of the screen and the partial frame 132c corresponds to a predicted user input to move the character to the top side of the screen. The generated partial frames 132a, 132b, and 132c are then stored in a database 140.

Although only three examples are illustrated in the figure for clarity, in some instances, the frame generator 112 is capable of generating more than three partial frames to be stored within the database 140. For example, the database 140 can contain over thousands of partial frames that each correspond to common imagery and other display elements that are likely to be shown in the environment included in a display that is provided for output to a computing device.

FIG. 1C illustrates an example of encoding of a VR content using predicted partial frames. As described above, during an active streaming session, the frame selector 114 selects one or more partial frames from the stored partial frames within the database 140, and then the encoding engine 116 encodes the selected partial frame 132*b* to generate an encoded video 102*b* with an updated portion 134 corresponding to a selected partial frame.

The partial frame generation process illustrated in FIG. 1B and the partial frame selection and encoding process illustrated in FIG. 1C can both be performing during a streaming session. However, in some implementations, in order to reduce latency attributed to partial frame calculation, the technique illustrated in FIG. 1B can be performed during an inactive streaming session when there is limited activity presently taking place on the screen, e.g., during loading screens, title menus and/or other time frames of limited on-screen activity. In such implementations, the partial frames are computed prior to the user's participation in an active streaming session where user inputs are provided to the computing device 120. Additionally, or alternatively, in other implementations, to reduce the total number of predicted user actions that are possible, the partial frame calculations may be computed during an active streaming session but for a particular time preceding a time point associated with when a user input is received, e.g., 30-50 ms prior to receiving user input. In such implementations, because the partial frames are computing when the user is already participating in a certain activity, the overall number of predicted user actions (and therefore, the variability of user actions) is reduced compared to computing all possible user actions when the user is in an inactive streaming session.

The database 140 may include a hash table that associates each of the predicted partial frames to one or more hash codes for user inputs received on the computing device 120. For instance, the hash table can be generated based on prior user inputs submitted either by the user, or by other users using the same content as described above. Once the frame selector receives data control signal data indicating one or more user inputs, the frame selector 114 may identify the corresponding partial frames within the database 140 that correspond to the received inputs.

In the example depicted in in FIG. 1C, the frame selector 114 receives user input data indicating that the user has pressed a left button on the input module 124 of the computing device 120. The frame selector 114 then users a predetermined identifier associated with the left button press input to obtain and select the partial frame 132*b* from stored within the database 140. In this example, the partial frame 132*b* is selected as it most likely represents a change within the frame 102*a* resulting from the received user input, e.g., moving a character's location towards the left side of the screen.

The selected partial frame 132*b* may include a sequence of frames for a particular time period that represents an animation of a character traveling from the original location indicated within the frame 102*a* to a location specified by the user input received on the computing device 120. The selected partial frame 132 is then encoded by the encoding engine 116 in order to generate the encoded video 102*b*. In the encoded video 102*b*, the portion 134 of the frame corresponding to the character location is replaced with the selected partial frame 132*b* such that the encoded video 102*b* represents a video that displayed for output on the computing device 120 in response to the received user input. In this example, because only the portion 134 is transmitted and processed over the network (as opposed to the entire field of view associated with the frame 102*a*), the size and/or number of data packets to be transmitted through the network 105 in order to generate an updated video indicating the user input is smaller relative to conventional video streaming techniques. This reduces latency associated with the network transport time for data packets to be transmitted between the host system 110A and the computing device 120.

Figure 2:
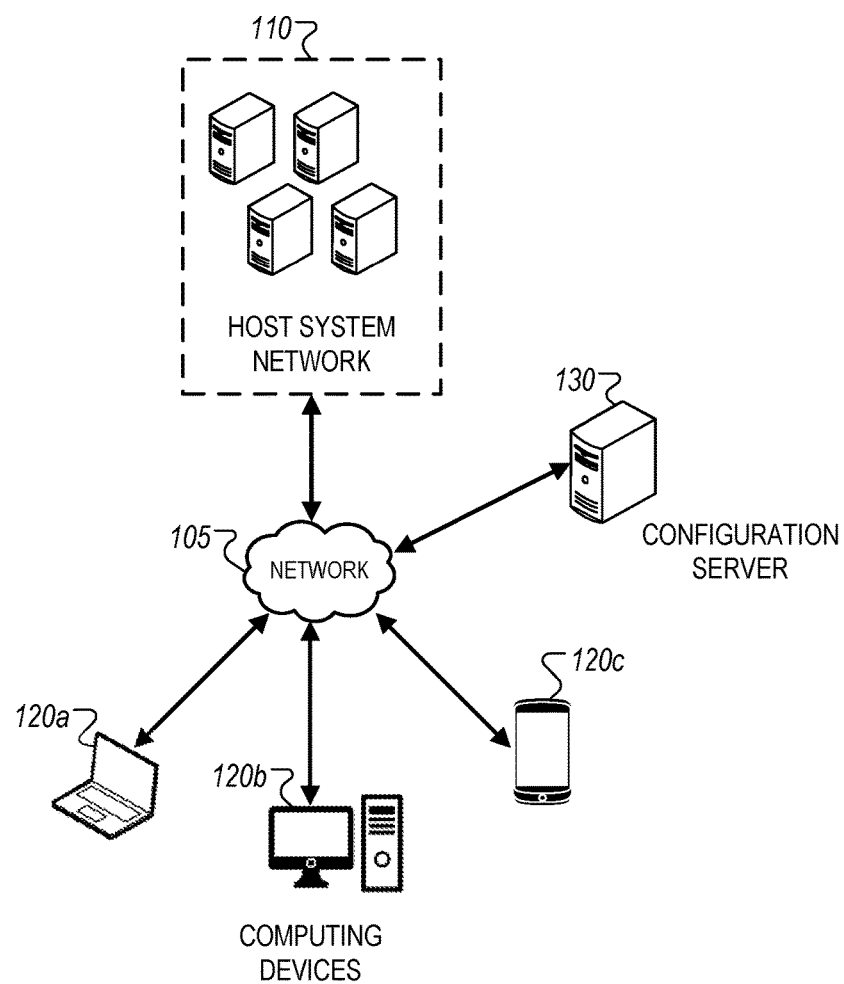
FIG. 2 illustrates an example of a system that can be used to provide a virtualized computing environment.

FIG. 2 illustrates an example of a system 200 that can be used to provide a virtualized computing environment for streaming VR content. The system 100 can include a host system network 110 that includes one or more host systems, a configuration server 120, and one or more computing devices 120*a*-*c*. The components of the system 200 can exchange data and network communications with one another over a network 105. In some implementations, the configuration server 130 itself can be included within the host system network 110 and/or can operate as another host system.

The architecture of the system 200 permits local applications running on the computing devices 120*a*-*c* to remotely access VR content that run on the host systems within the host system network 110. The host systems within the host system network 110 can be configured to run VR applications of different types. For example, a host system may locally run a VR gaming application that can be adjusted based on user input provided through a local application running on one of the computing devices 120*a*-*c*. In another example, a host system may play a file of a 360-degree video and portions of video are streamed to one of the computing devices 120*a*-*c*. In these examples, the configuration server 130 can dynamically configure and/or adjust communications between the client devices 120*a*-*c* and the host systems such that the local applications provide a user with access to VR content.

In general, the host systems within the host system network 110 can represent any type of computer system, e.g., a network server, a media server, a home network server, etc., that are capable of performing network-enabled functions such as hosting a set of shared resources for remotely streaming a virtual instance of an application (referred throughout as a "virtualized application"). In some instances, the host system network 110 includes the host system 110A depicted in FIG. 1A.

The configuration server 130 can be used to store various types of data and/or information associated with the host systems within the host system network 110. For instance, the configuration server 130 may store installation data associated with applications that are installed on the host systems within the host system network 110, configuration data that adjusts the performance of the host systems within the host system network 110 during a remote streaming session, among other types of information. In addition, the configuration server 130 may also store data of the users associated with the computing devices 120*a*-*c*. For instance, the configuration server 130 may store user profile data that identifies a list of installed virtualized applications, network and device attributes, and other types of categorical data associated with each computing device.

The user profile data stored on the configuration server 130 can be used to configure remote streaming sessions between the host systems of the host system network 110 and one of the computing devices 120*a*-*c* as it relates to streaming VR content. For example, when a user initiates a remote streaming session, user profile data may be used to dynamically fetch a list of installed VR applications and/or content, application data associated with each of the installed applications, and/or user-specific data such as user preferences. In this regard, user profile data stored on the configuration server 130 can be used to enable similar remote streaming experiences between each of the host systems included within the host system network 110. For example, in some instances, the system may be capable of performing dynamic resource allocation such that different host systems can be used to during different remote streaming sessions of a single computing device while providing substantially similar user experiences.

In some implementations, the user profile data stored on the configuration server 130 includes a bandwidth budget for a computing device of a user specified by the user profile data. The bandwidth budget can be dynamically adjusted based on, for example, changes in the network connectivity speeds of a local area network that connects the computing device to the network 105. The dynamic adjustments can be made to ensure that the network connection over the LAN is as real-time as possible (i.e. that changes in the connection speed do not impact streaming performance). For example, dynamic changes to the bandwidth budget can cause the host system 110A to adjust image quality of VR content provided to the computing device and/or the amount of rendering and/or encoding of VR content using predictive partial frames as discussed above in FIGS. 1A and 1C.

The computing devices 120a-c can each be any type of network-enabled electronic device that is capable of rendering a video stream received over the network 105. In some instances, the computing devices 120a-c are electronic devices with limited hardware capabilities, e.g., a device without a dedicated GPU, as discussed above.

The network 105 may be any type of network, including any combination of an Ethernet-based local area network (LAN), wide area network (WAN), a wireless LAN, and the Internet. The host devices 110 may also include at least one processor (not shown) that obtains instructions via a bus from main memory. The processor can be any processor adapted to support the techniques described throughout. The main memory may be any memory sufficiently large to hold the necessary programs and data structures. For instance, the main memory may be one or a combination of memory devices, including Random Access Memory (RAM), non-volatile or backup memory, e.g., programmable or Flash memory, read-only memory, etc.

The system 200 discussed above can be configured to perform various operations techniques that support and/or improve one or more of the generation of partial frames, the selection of partial frames that are relevant to rendering a subsequent frame, and/or generating a fully-assembled frame using the selected partial frames.

For example, in some implementations, the system 200 can combine partial frames in manner that permits perceptual compromises and/or certain artifacts to reduce the computational burden involved in rendering a fully-assembled frame to be displayed on the computing device 120. When such perceptual compromises and certain artifacts are allowed, this may result in large regions of frames coalescing to the same equivalent image. The equivalent portions may be encoded based on a probability-weighted average of alternative partial frames.

In some implementations, the system 200 renders partial frames based on some mix of pre-rendered images and/or geometry information known prior to rendering. Among other things, knowledge of geometry can be used to save a lot of computing time, directly identifying differences between frames and what distortions can be performed (whether from stored partial frames or as equivalents to motion vectors applied to parts of an earlier frame).

When a partial frame is shared amongst many alternative future frames, but with different distortions, the host system 110 may choose to send a larger version of the image, possibly with a pre-distortion, so as to maximize the image quality for all potential references, as discussed below.

Figure 3:
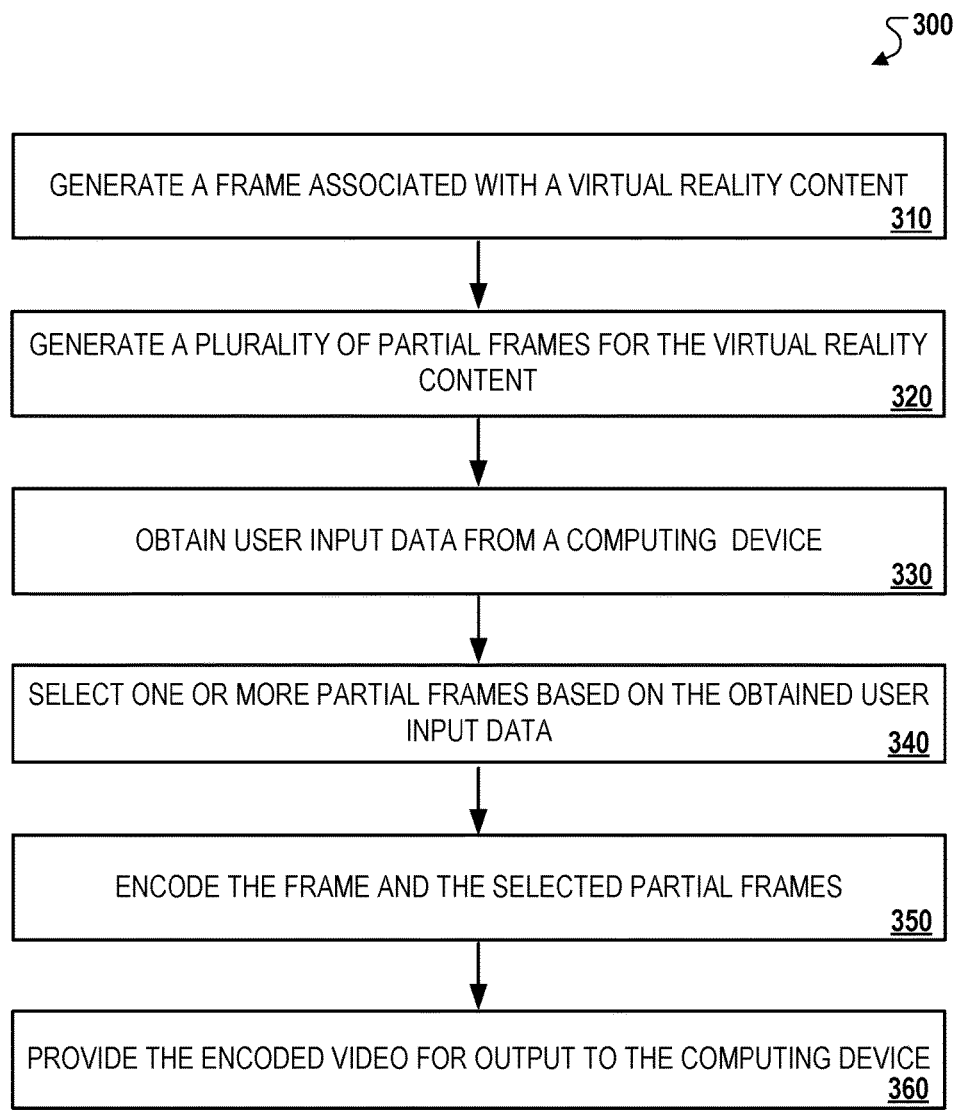
FIG. 3 illustrates an example of a process for using stored partial frames to encode a VR content.

FIG. 3 illustrates an example of a process 300 for using stored partial frames to encode VR content. Briefly, the process 300 can include generating a frame associated with a VR content (310), generating a plurality of partial frames for the VR content (320), obtaining user input data from a computing device (330), selecting one or more partial frames based on the obtained user input data (340), encoding the frame and the selected partial frames (350), and providing the encoded video for output to the computing device (360).

In more detail, the process 300 can include generating a frame associated with a VR content (310). For instance, the frame generator 112 may generate the frame 102 associated with a VR content to be remotely provided from the host system 110A to the computing device 120. The frame 102 includes an entire field of view of the video to be outputted to the computing device 120. In the context of VR applications, the input frame 102 can represent a static image of a 360-degree video with multiple images stitched together to form an image with an ultra-wide field of view.

The process 300 can include generating a plurality of partial frames for the VR content (320). For instance, the frame generator 112 may generate the set of partial frames 104 that correspond to predicted user actions that can be performed by the user during the time period when the frame 102 is provided for output to the user on the computing device 120. As described above, each of the predicted partial frames can represent a video segment for a particular time period that represents a change to the frame 102 in response to a corresponding user action being performed within the VR application. Some examples of user actions include movements to a character within the field of view of the frame 102 or instructions for the character to perform a specified action.

The process 300 can include obtaining user input data from a computing device (330). For instance, the frame selector 114 may receive data indicating one or more user inputs received through the input module 124 of the computing device 120.

The process 300 can include selecting one or more partial frames based on the obtained user input data (340). As described above, the frame selector 114 may select one or more partial frames from among the predicted partial frames that are generated by the frame generator 112 and are stored within the database 140 based on the user input data obtained from the computing device 120. In some implementations, the selected partial frames are identified with the use of a hash table that associates distinctive hashes associated with each user input to partial frames that were generated as predictions for a particular user input. In such implementations, distinctive hashes associated with received user input data are identified and then used to determine the partial frames that correspond to the received user input.

The process 300 can include encoding the frame and the selected partial frames (350). For instance, the encoding engine 116, which may be on the host system 110A and/or the computing device 120, may generate an encoded video 108 for the selected partial frames 106. As described above, the encoding engine 116 may use various video codecs to encode each of the selected frames 106 as video files. In implementations where the encoding engine 116 resides on the computing device 120, the encoding engine 116 also generates the rendering instruction 109, which includes a representation of the difference between the frame 102 and an updated frame for the VR content based on the user input received from the computing device 120. The computing device 120 then utilizes the rendering instruction 109 to encode the selected partial frames 106 into the encoded video 108.

The process 300 can include providing the encoded video for output to the computing device (360). For instance, the encoding engine 116 may provide the encoded video 108 for the selected partial frames 106 for output to the computing device 120. As described above, because the encoded video 108 only represent portions of the frame 102 that are changed due to a user input provided by a user, the necessary bandwidth (and the corresponding network transport speed) necessary to transmit the encoded video 108 from the host system 110A to the computing device 120 over the network 105 is reduced relative to the necessary bandwidth and corresponding network transport speed for an encoded video that includes the entire field of view of the frame 102.

Figure 4A:
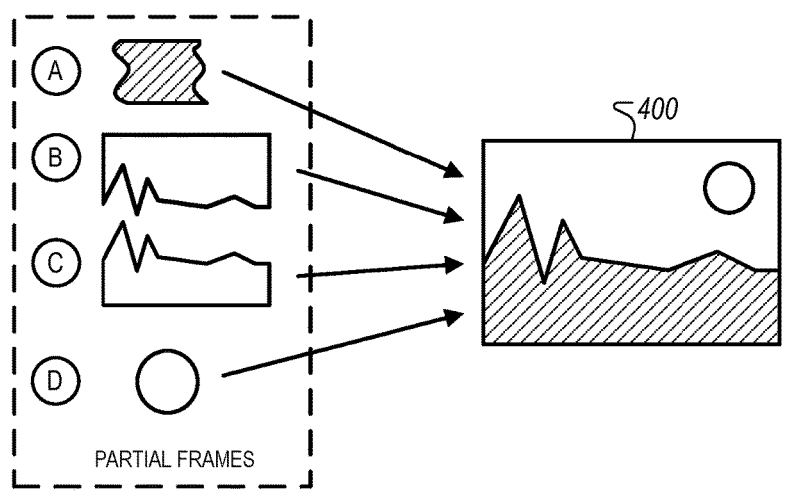
FIG. 4A illustrates an example of partial frames that make up a single frame.

FIG. 4A illustrates an example of partial frames that make up a single frame 400 of VR content as discussed throughout. In the example depicted, the frame 400 is composed of four partial frames are labelled with letters "A" through "D." In this example, partial frame A represent a texture that is wrapped around an object present within partial frame C to render the appearance of landscape displayed in frame 400. Partial frames B and C represent background and foreground portions of the frame 400, respectively, and partial frame D represents an object that is placed on top of the background portion represented by partial frame B. Partial frames of the frame 400, in this example, are formed from arbitrary shapes that are defined by shapes of objects and/or display elements that viewed in the frame 400. In other examples, as discussed below, a partial frame is instead defined by a pixel array, e.g., a rectangular pixel array, which represents a subset of pixels of a full frame. The partial frames depicted in FIG. 4A are discussed below in reference to the techniques depicted in FIGS. 4B and 4C.

Figure 4B:
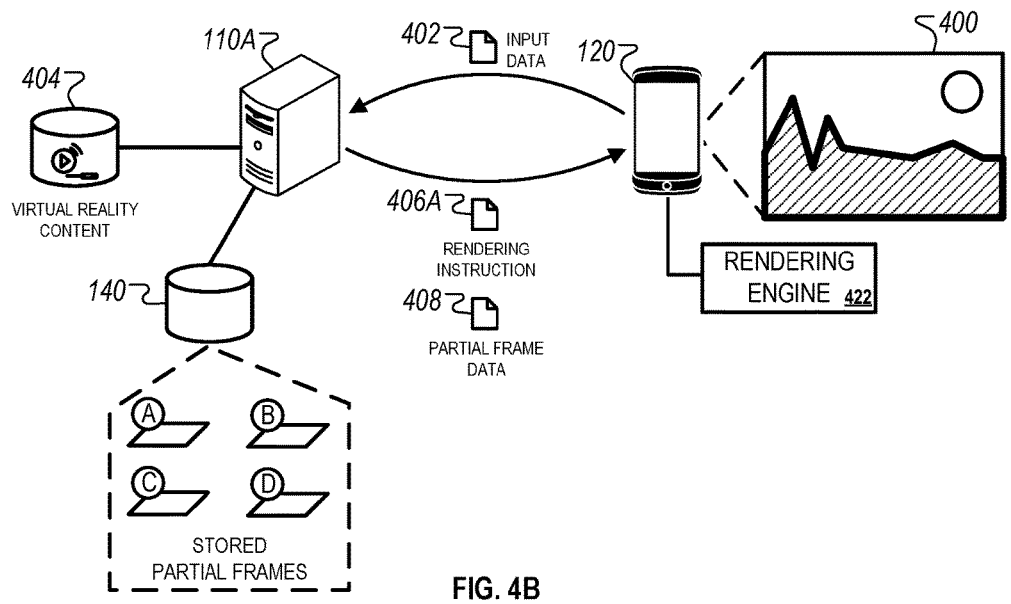
FIG. 4B illustrates an example of a technique for encoding VR content using partial frames that are stored on a host system.
Figure 4C:
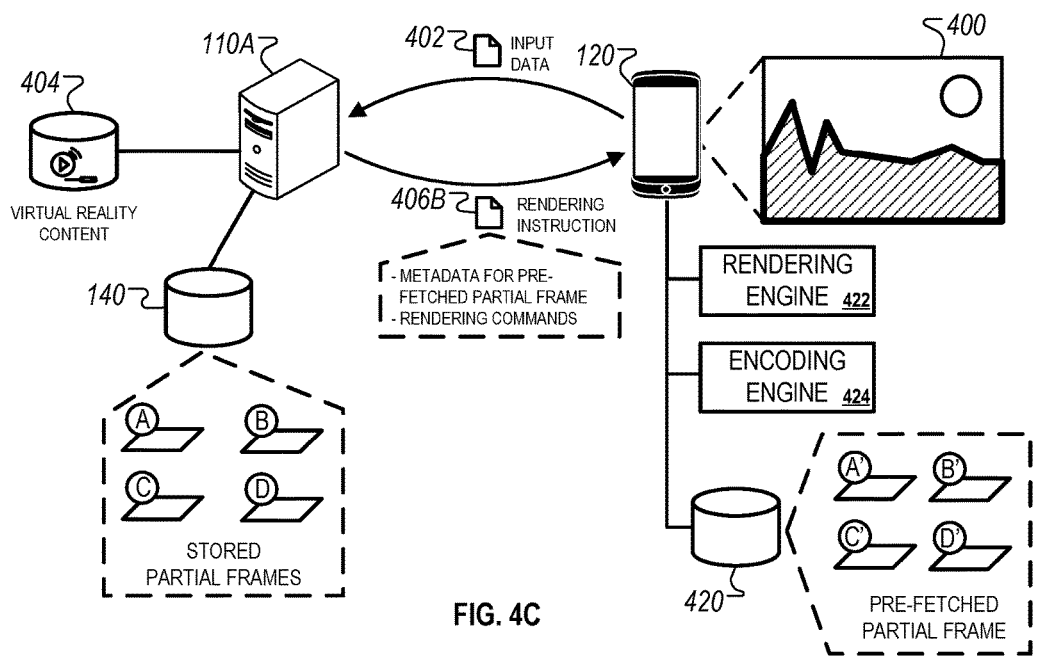
FIG. 4C illustrates an example of a technique for encoding VR content using partial frames are pre-fetched and stored on a computing device.

FIGS. 4B-C illustrate examples techniques for encoding VR content using partial frames. In each of these examples, the host system 110A runs VR content 404, which is then streamed to the computing device 120 over a network-based connection. For example, if the VR content 404 is a video, then the host system 110A plays a locally stored video file, and the local playback is streamed over a network to the computing device 120. In another example, if the VR content 404 is a virtual reality game, then the host system 110A locally runs a gaming application, and local playback of the game is streamed over a network to the computing device 120. In each of these examples, display of the VR content 404 can be adjusted and/or modulated based on input data 402 received from the computing device 120 such that the stream of the VR content on the computing device 120 provides a user with the appearance that the VR content is running locally on the computing device 120.

As discussed above, the techniques depicted in FIGS. 4B and 4C use partial frames to render and encode the VR content 404 to reduce latencies associated streaming content over a network. Referring initially to FIG. 4B, the illustrated technique uses partial frames that are stored on the host system 110A. In this example, partial frames A-D (depicted in detail in FIG. 4A) are stored in the database 140 in a similar manner as discussed above with respect to FIGS. 1A-C. The host system 110A uses these stored partial frames to generate a rendering instruction 406A and partial frame data 408 that are then transmitted to the computing device 120. A rendering engine 422 of the computing device 120 applies commands specified within the rendering instruction 406A to render the frame 400 using the partial frames included within the partial frame data 408. In this example, the partial frame data 408 include encoded files of the partial frames A-D, which are then used by the rendering engine 422 for frame rendering, as discussed above in FIGS. 1A and 1C.

Referring now to FIG. 4C, the illustrated technique uses pre-fetched partial frames that are stored locally on the computing device 120. In this example, partial frames A-D are transmitted to computing device 120 in advance of the time it is expected to be displayed on the computing device 120. For example, the partial frames A-D stored in the database 140 can be transmitted to the computing device 120 before the computing device 120 initiates a streaming session of an application that displays the VR content 404. In another example, the partial frames A-D can be transmitted to the computing device 120 during a period of limited activity on the application, e.g., during a loading screen or a menu sequence, prior to displaying or accessing the VR content 404. In some instances, partial frames can also be sent in advance so that network bandwidth and latency can be reduced at the time that the content is to be displayed. Preferably, most or all of a predicted partial frame and associated display instructions can be transmitted ahead of time prior to display. Ideally, this would involve the host system 110A indicating to the computing device 120 which partial frame to select. In some implementations, selection of partial frames can be based on event triggers or player motion, which result in a communication to display the selected partial frame.

The partial frames A-D stored in the database 140 that are transmitted to the computing device 120 are stored in a pre-fetch buffer 420 on the computing device 120, or alternatively, alongside partial frames cached from prior frames. The pre-fetch buffer 420 stores pre-fetched partial frames A'-D' corresponding to partial frames A-D, respectively, stored in the database 140. Because the pre-fetched partial frames A'-D' are locally stored on the computing device 120 when VR content 404 is accessed, the network bandwidth required to perform the rendering technique depicted in FIG. 4C is reduced relative to the technique depicted in FIG. 4B.

In the example depicted in FIG. 4C, the host system 110A selects a partial frame for encoding and/or rendering in a similar manner as discussed above for FIGS. 1A, 1C, and 4B. However, instead of transmitting partial frame data, e.g., data including encoded video data for the partial frames, the host system 110A instead generates and provides an instruction 406B that includes metadata that identifies selected pre-fetched frames from the pre-fetched frames that are stored within the pre-fetch buffer 420. Once received, the computing device 120 uses metadata specified within the rendering instruction 406B to identify and access the selected pre-fetched partial frames for rendering and encoding by the rendering engine 422 and the encoding engine 424, respectively. For example, metadata can include a specific identifier that is assigned to a particular partial frame, e.g., a hash code, an alphanumeric identifier. In this example, the database 140 includes a mapping or lookup table that enables the host system 110A to determine the metadata for selected partial frames to include within the rendering instruction 406B.

As discussed above, the partial frames can represent either prior changes or predicted changes to the VR content 404. In the first example, the partial frames represent changes that were previously displayed on the computing device 120, whereas in the second example, the partial frames represent predicted changes that have not yet been displayed on the computing device 120 but are likely to be displayed based on, for example, attributes of the VR content 404, user input provided by the user, among others. In some implementations, the database 140 and/or the pre-fetch buffer 420 may include separate data structures for storing partial frames that represent prior changes and partial frames that represent predicted changes to improve recall of certain types of partial frames.

In some implementations, the host system 110A can utilize a replacement policy to remove stored partial frames in the database 140 as storage becomes limited due to partial frames being added to the database 140. In such implementations, the host system 110A may use different removal strategies, such as least recently-used or first-in-first-out, to remove partial frames that are less likely to be used for rendering to make storage space for newly added partial frames. As discussed below, in some implementations, the host system 110A retains partial frames in the database 140 using prioritization scores representing respective likelihoods that a change represented by a particular partial frame will subsequently occur in the VR content 404.

Figure 5:
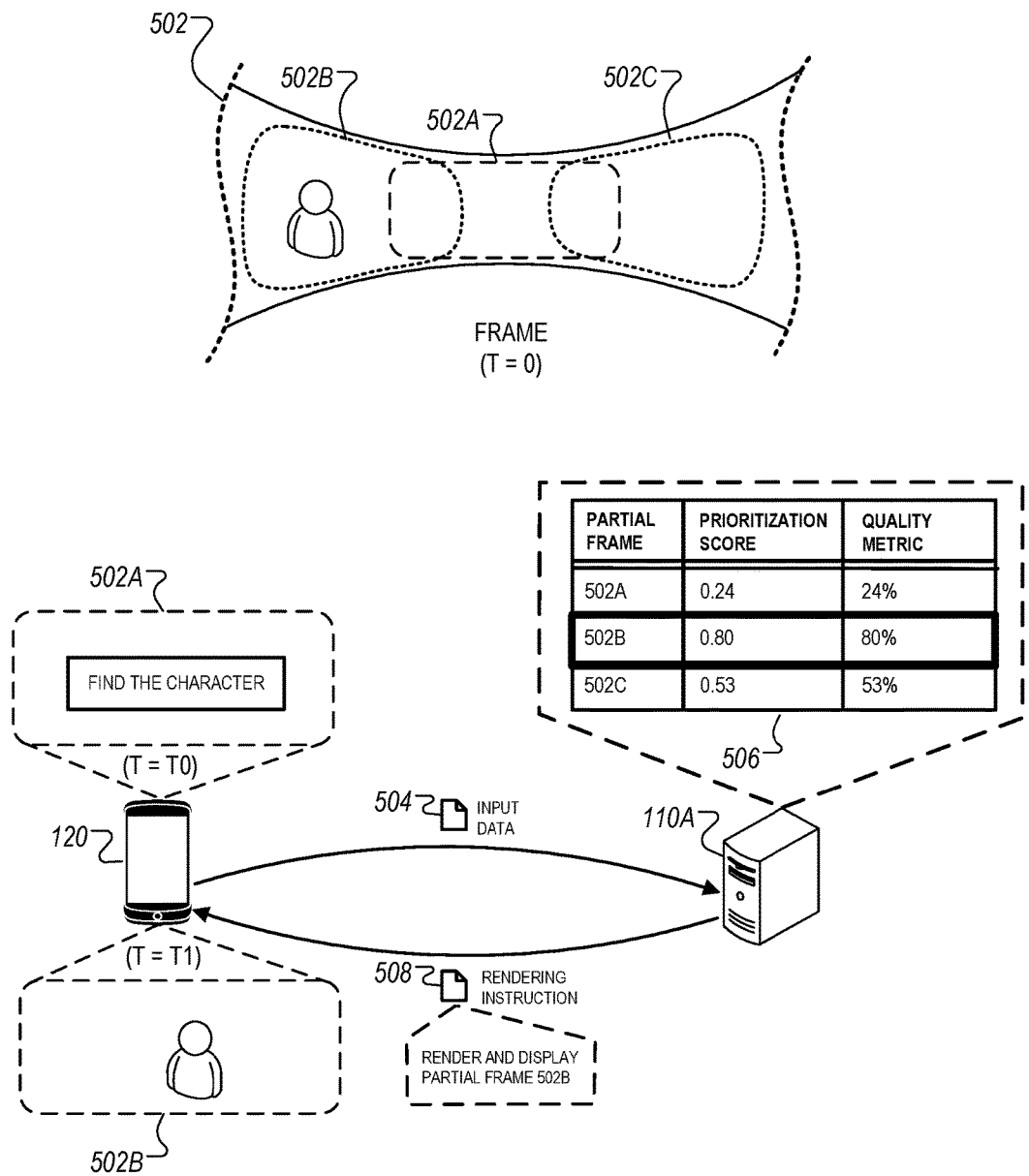
FIG. 5 illustrates an example of a technique for predicting a partial frame of virtual reality content that is likely to be displayed.

FIG. 5 illustrates an example of a technique for predicting a partial frame of VR content 502 that is likely to be displayed on the computing device 120. In this example, the VR content 502 includes multiple overlapping partial frames 502A, 502B, and 502C. In this example, a frame that includes partial frame 502A is presently being displayed on the computing device 120, e.g., the frame displayed at time point T0, when the prediction is performed. In this example, each of the partial frames 502A-C are generated and stored on the host system 110A before time point T0 so that the prediction can be used to render only the predicted partial frame without having to render an entirely new frame, thereby reducing latency associated with streaming VR content 502.

The host system 110A predicts which of the partial frames 502A-C will most likely be present in the next displayed frame, e.g., the frame displayed at time point T1. As discussed above, this prediction can be based on information included within input data 504, which is received from the computing device 120 at or before time point T0.

In the example depicted in FIG. 5, the input data 504 indicates that the frame displayed at time point T0 provides a text specifying an instruction to the user to find a character that is presently located to the left of the current field of view of the VR content 502 at time point T0 (i.e., left of the displayed frame that is not within the current field of view). In this example, the host system 110A, uses this information to compute prioritization score for each partial frame that represents a respective likelihood that a subsequently displayed frame, e.g., the frame displayed at time point T1, should include a corresponding partial frame. As shown, the host system 110A determines a higher prioritization score for partial frame 502B than the partial frames 502A and 502C because the partial frame 502B is known to include the character that is referenced in the instruction provided to the user in the frame displayed at time point T0 (increasing the relative likelihood that the user will provide an input that adjusts the current field of view of the VR content 502 to left of the current field of view displayed in the frame displayed at time point T0).

The host system 110A selects the partial frame 502B from among the partial frames stored within the database 140 (not shown), and generates a rendering instruction 508 in a similar manner as discussed above for FIGS. 1A, and 4B-4C. In this example, the rendering instruction 508 includes commands to render and display partial frame 502B within the frame that is subsequently displayed at time point T1. As discussed above, the subsequently displayed frame can be generated by only adjusting a portion of the first frame displayed at time T0 displaying partial frame 502A with the partial frame 502B. In this regard, other portions of the first frame that are not impacted by the user input, e.g., background textures, remain unchanged. Alternatively, the other portions of the first frame may be have transformations applied to them, such as translations, rotations, scaling, and sheer, using commands possibly similar to those that refer to partial frames stored in a database.

In some implementations, the host system 110A computes the prioritization scores within the table 506 using various statistical models such as machine learning techniques. In some implementations, the host system 110A uses a neural network that is trained to predict a change to one or more regions of a displayed frame based on various types of input data received from the computing device 120, e.g., context data, user activity data, location data, or application use data. In some implementations, the input data used to perform such predictions also includes data stored within a graphics stack of the GPU of the host system 110A that runs the VR content 502. For example, the host system 110A can use knowledge of textures that will be used in a rendered three-dimensional scene to determine likelihood of future use in other scenes, or in other parts of the same scene. Additionally, the graphics stack data can specify distortions, e.g., rotation and scaling transformations, that can also be used to generate partial frames and/or predict the probability that a particular partial frame will be subsequently displayed.

In some implementations, the host system 110A computes probabilities specified by the prioritization scores based on pre-rendering partial frames. In such implementations, the graphics stack of the host system 110A applies a model of probable future scene changes, such as those caused by camera movement in a three-dimensional scene. There will typically be substantial overlap of frame contents, where regions of frames that appear the same in a majority of pre-rendered frames have the highest probability of reference. Additionally, the computed probabilities can be augmented by identifying the similar regions between future and past frames.

In some implementations, partial frames may be stored losslessly to preserve image quality, or alternatively, in a compressed format using a lossy algorithm using a specified image quality requirement. In such implementations, the host system 110A can compute a quality metric that specifies the image quality requirement for each partial frame. In some instances, such as the example depicted in FIG. 5, the host system 110A can use quality metrics that are correlated with prioritization scores to maximize storage utilization by prioritizing the quality of stored partial frames that are most likely to be subsequently used over the quality of stored partial frames that are less likely to be subsequently used. For example, as shown in FIG. 5, the partial frame 502B is assigned a quality metric of 80% (i.e. 80% quality preservation) because its prioritization score reflects an 80% likelihood that a subsequently displayed frame at time point T1 will include the partial frame 502B. In contrast, partial frames 502A and 502c, which have lower prioritization scores, are stored at lower quality levels, e.g., 24% and 53%, respectively. In some instances, the quality metric does not necessarily equal priority and can be some function of the priority score. For example, the quality metric can be possibly induced by a statistical model or a machine learning technique, or it may be selected to occupy a desired portion of network bandwidth, or other criteria.

Figure 6:
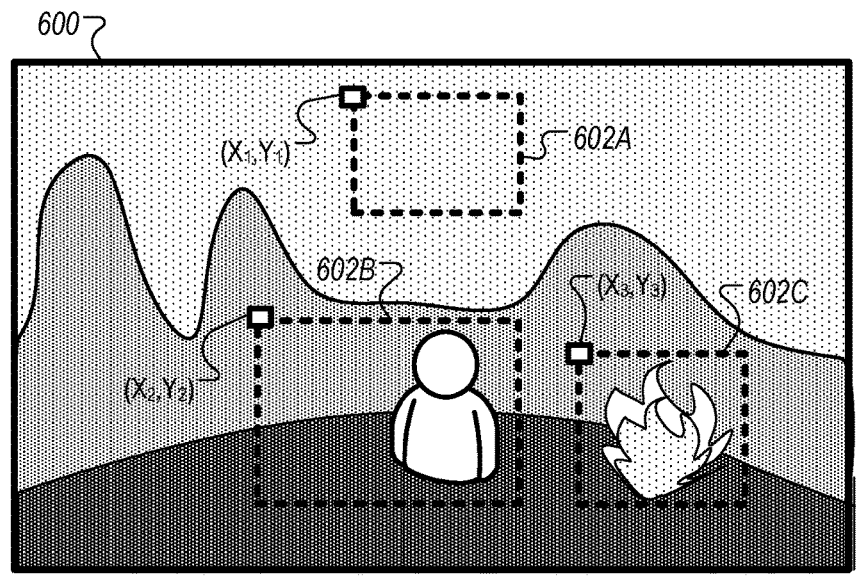
FIG. 6 illustrates an example of a frame with different probabilities computed for multiple regions of the frame.

FIG. 6 illustrates an example of a frame 600 with different probabilities computed for multiple region of the frame 600. In general, this figure represents an implementation where a system, e.g., system 200, generates partial frames from frames that were previously displayed to the computing device 120. In such implementations, partial frames are generated from regions of a frame that are determined to likely appear in subsequent frames, e.g., regions of previously presented frame that do not significantly change relative to subsequently presented frames.

In the example depicted in FIG. 6, frame 600 represents a frame from a virtual reality video game that was previously displayed on the computing device 120. In this example, the host system 110A processes the contents of the frame 600 to determine if any of its portions are likely to be displayed at a later time point. The portions that are likely to be displayed can then be included as partial frames within the collection of partial frames stored in the database 140. In this regard, the host system 110A is capable of processing previously displayed frames to identify partial frames with the highest likelihoods of being repeated across multiple frames of VR content.

In the example depicted in FIG. 6, the host system 110A analyzes three regions of the frame 600, which includes regions 602A, 602B, and 602C. The host system 110A applies statistical modeling techniques as discussed above to predict the likelihood that each of the regions 602A-C will be present in a frame that is subsequently displayed on the computing device 120. These likelihoods are represented as consistency scores identified in table 610.

As shown in FIG. 6, the host system 110A determines that region 602A has the highest consistency score of 0.99, followed by region 602B with a consistency score of 0.60, and region 602C with a consistency score of 0.15. In this example, the host system 110A computes the highest consistency score for region 602A because this region represents a background portion of the frame 600 that is unlikely to significantly cheaper change between frames. In contrast, the consistency score for the region 602B is computed to be lower because this region includes a character that is likely to be manipulated and moved by a user between frames. In the third example, the host system 110A computes the lowest consistency score for the region 602C because this region includes a visually dynamic object, e.g., a graphic of a fire, that changes between multiple frames and is unlikely to be appear if, for example, the user changes the current field of view shown in frame 600.

The table 610 also specifies pixel ranges that the host system 110A uses to crop regions 602A-C out of the frame 600 when generating partial frames that are then stored in the collection of partial frames in the database 140. In the example depicted in FIG. 6, each region is defined by a rectangular pixel array that is identified by pixel coordinates of reference pixels, e.g., the top left coordinate and the bottom right coordinate. In some other implementations, the regions within the frame 600 can also be defined by non-rectangular shapes, e.g., a shape corresponding to a shape of a display element within the frame 600, as depicted in FIG. 4A.

The host system 110A can compute the consistency scores for each region using different techniques. In some implementations, scores are computed on a pixel-by-pixel basis such that there are gradients and discontinuities in the probability space of a given frame. In such implementations, the host system 110A can use the gradients and discontinuities to both identify candidate regions within the frame 600 as partial frames, and compute the overall consistency score for each identified candidate region. For example, the host system 110A can divide the frame 600 into sections using number lines from lowest to highest probability. The exact divisions of the probability space could be fixed or variable in number, and the sizes of the divisions could also be fixed or variable. The divisions may be determined on the basis of sizes and shapes of partial frames that result. Additionally, the consistency score for a region can be determined based on combining the probabilities of the pixels included in the region.

As an example, each pixel in a frame can have an estimated probability of future reference from 0.00 (0%) to 1.0 (100%). One possibility would be to divide the probability space into fixed 1% increments. There would then be portions of the frame whose per-pixel reference probabilities are in the range of 81% to 81.99999%, and contiguous regions of pixels in that probability range could be cut out and turned into partial frames.

As discussed above, partial frame shapes may not necessarily be rectangular, and the dividing lines specifying the edges of partial frames may not necessarily be straight lines. In some implementations, curved and/or convoluted boundaries may be taken at face value to identify discrete regions within the frame. In other implementations, curved and/or convoluted boundaries can be straightened out according to heuristics that are used to assist in identifying convenient shapes for compression and transmission. In some other implementations, partial frames can be organized entirely in terms of small rectilinear units, e.g., rectangles or squares.

In some instances, once a region of a frame is segmented, e.g., for storage as a partial frame, the host system 110A may further process the identified shape of a candidate region. For example, the host system 110A can reduce the complexity, reduce the frame size, or fill "holes" representing areas of different probability or which are unchanged from a prior frame. In such implementations, the host system 110A is capable placing reasonable limits on partial frame sizes and shapes when generating partial frames for candidate regions within the segmented frame.

In some instances, while partial frames may not be rectangular, the host system 110A may nonetheless map, e.g., distort, the partial frames to rectangular shape for the compression. Additionally, the host system 110A may generate some partial frames from a frame and stored them as different partial frames that represent alterations applied on top of, or a part of, a frame to be subsequently rendered. The host system 110A can also indicate partial frames as large-scale distortions to represent, for example, commonly applied motion vectors.

In some implementations, the host system 110A may use geometry data known to its GPU to improve prediction of partial frames from previously displayed frames, as discussed above with respect to FIGS. 1A and 1B, and/or the identification of partial frames based on determining regions of a previously displayed frame that are likely to be repeated, as discussed above with respect to FIG. 6.

For example, the host system 110A may use a variety of information sources to improve accuracy of predicted scene changes that are represented in a partial frame. Examples of such sources of information can include statistical models and machine learning, e.g., models that are learned empirically on per-application and per-user basis. Another example of a source of information is the application where the VR content is displayed, e.g. a video game application, that is run on the host system 110A and/or the computing device 120. As an example, a game engine, e.g., middleware that computes physics and low-level scenes from high-level descriptions, is aware of the environment that a player is in, the extent to which the user can move in that environment, the proximity of the camera to objects displayed in the scene, among others. This type of information can be used to narrow the scope of prediction for possible frames that may be subsequently displayed. Additionally, constraints on player action such as how fast a player can move in a game, including those imposed by software and those imposed by physical input devices, can further narrow the scope of prediction. These information sources can be combined to generate probability density functions for the breadth of possible future fields of view.

In some implementations, the host system 110A can combine field of view probabilities with identifications of the content overlap between possible frames to compute priorities for partial frames that may then be used to assemble partial frames on the computing device 120.

In some implementations, the host system 110A can use both motion prediction and actual motion to compute a first estimate of distortions that can be applied to past frames and stored partial frames when assembling a predicted frame. If encoding is being performed based on fully rendered images, then the estimated distortions can be used as a starting point for identifying all of the different local distortions that can occur for different parts of the frame. For example, if transformations were limited to portions of a prior frame, then the final set of distortions would be two parallel meshes, indicating how regions of the prior frame are distorted to compute its successor. In the more general case, distortions can refer to multiple prior frames and stored partial frames.

In some instances, the host system 110A and/or the computing device 120 can short-cut the rendering process by examining geometry information known to the GPU of the host system 110A, a graphics driver of the GPU, a user-space graphics library, a game engine, and/or an application that accesses VR content. For instance, at the GPU level, a displayed scene is represented in terms of meshes of triangles, and onto those triangles are mapped various textures. Both triangle edges and texture edges can be natural boundaries that constitute a starting point for efficiently computing how to partition a rendered frame. Additionally, texture transformation information used by the GPU can be directly translated into distortions that the client would apply to the original textures (which are uploaded to the computing device 120 just in time or earlier). The same texture information can also be used to determine distortions to apply to other partial frames and sections of earlier full frames, whenever the geometry is known for objects rendered in the earlier frame. Using triangle meshes known by the GPU, various optimizations can be performed, such as combining neighboring triangles when their distortions are the same. The same geometry information can also be used for both partitioning and computing distortions as discussed throughout.

In addition to partitioning and computing distortions, the host system 110A can compute partial frame priorities, e.g., prioritization scores, from geometry information known to the GPU of the host system 110A. For example, the host system 110A may choose to send textures far in advance of their use in rendering, making that decision based on when textures are loaded into graphics memory. Alternatively, the host system 110A may send textures based on geometric contents of current and predicted frames. The priority of a whole texture can be estimated based on its frequency of reference in both current and predicted frames, or relative to the reference frequency of other textures. The host system 110A may choose to send whole textures or only portions, based on the union and priorities of regions in frames being encoded.

To some extent, the geometry-based techniques discussed above may facilitate offloading graphics rendering to the computing device 120, even though the computing and graphics capabilities of the computing device 120 may be much less than that of the host system 110A. However, in such instances, the GPU of the host system 110A performs the more resource-intensive tasks associated with rendering, such as hidden surface removal and off-screen rendering, while only the final stage of rendering visible frames is performed locally by the hardware of the computing device 120.

In some implementations, the host system 110A and/or the computing device 120 is capable of using various techniques reduce computing and network bandwidth while performing the rendering techniques discussed above. For example, the host system 110A and/or the computing device 120 can render the partial frames to permit perception-based compromises that reduce the quality of rendering but to a level that is minimally perceivable to a user. For example, if panning between frames occurs at a high speed, a user will be unable to perceive sharp edges of objects displayed in the frames. Additionally, each frame will appear for only 16.6 milliseconds or less (for a 60 Hz frame rate or faster), making many artifacts imperceptible. In this example, rendering can be coarsely performed to represent only what the user is expected to see, without preserving image quality that is unlikely to be perceived by the user.

Figure 7:
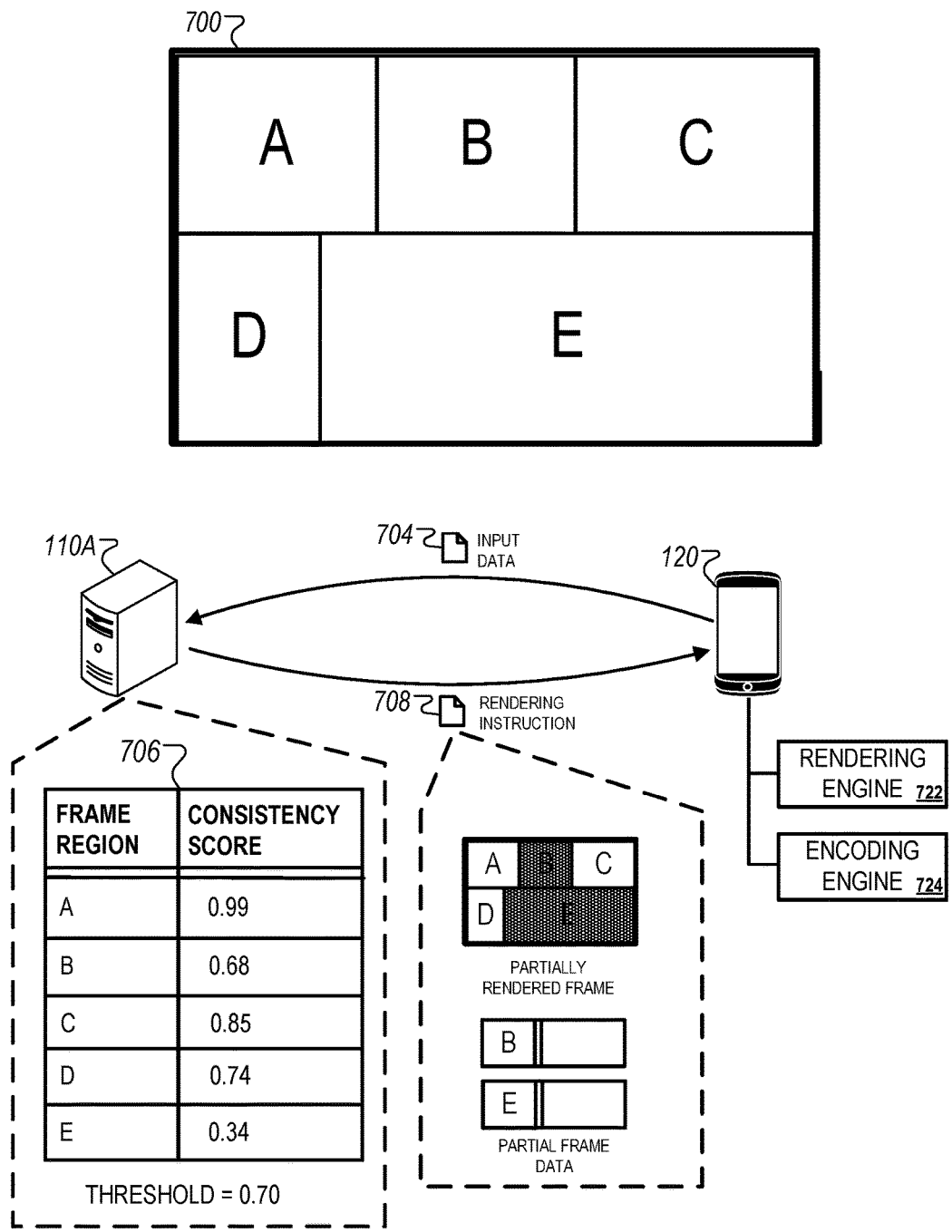
FIG. 7 illustrates an example of technique for generating a partially generated frame based on consistency scores computed for multiple regions of the frame.

FIG. 7 illustrates an example of technique for generating a partially generated frame based on consistency scores computed for multiple regions of the frame. In general, this figure represents an implementation where a system, e.g., system 200, partially generates regions of a frame that are unlikely to change in subsequent frames. The regions of the frame that are likely to change remain un-encoded and rendered on-demand using partial frames using techniques discussed throughout.

In the example depicted in FIG. 7, a frame 700 is segmented into regions that are labelled in the figure with letters "A" through "E." Regions A-E represent five regions of the frame 700 that are evaluated for their likelihood to change in subsequent frames. To accomplish this, the host system 110A computes a consistency score for each region that represents a likelihood that a corresponding region of the frame 700 will change in a subsequently displayed frame.

The host system 110A initially receives input data 704 from the computing device 120 in a similar manner as depicted in FIGS. 1C, 4B, 4C, and 5. The host system 110A computes consistency scores based on, for example, identifying similarities between multiple previously presented frames before the frame 700, e.g., to identify regions that do not significantly change between consecutive frames of a frame sequence that include the frame 700. In other examples, the host system 110A identifies inputs specified within the input data 704 to predict changes to the frame 700, as discussed above, and then determine the likelihood that regions A-E of the frame 700 will change.

After computing the consistency scores for regions A-E, host system 110A compares computed consistency scores to a predetermined threshold to identify regions of the frame 700 that are likely to change, e.g., regions with consistency scores that do not exceed the threshold, and regions of the frame 700 that are not likely to change, e.g., regions with consistency scores that exceed the threshold. Regions of the frame 700 that are not likely to change (or are likely to be shared among many alternative future frames) are encoded by the host system 110A and transmitted within the rendering instruction 708 as a partially generated frame. Alternatively, regions of the frame 700 that are likely to change (or have lower probabilities or lower consistency scores or lower priorities) are not encoded within the partially generated frame. Instead, the host system 110A includes partial frame data for these regions so that the computing device 120 can render and encode these regions on-demand using one or more partial frames included in the partial frame data.

In the example depicted in FIG. 7, regions B and E of the frame 700 are determined to likely change in subsequent frames whereas regions of the frame 700 are determined to not likely change in subsequent frames based on the values of their consistency scores relative to the threshold value of 0.70. The host system 110A then generates a partially generated frame that included un-encoded portions corresponding to regions B and E of the frame 700. In this example, the regions A, C, and D represent static regions of the frame that can be re-used between multiple subsequent frames whereas regions B and E represent dynamically changing frames that are rendered and encoded by a rendering engine 722 and encoding engine 724 of the computing device 120, respectively. The regions B and E are encoded and rendered dynamically using partial frame data for these regions. The partial frame data can include multiple alternative partial frames for each region from which the host system 110A selects using techniques discussed above to encode and render the un-encoded regions of the partially generated frame.

In some implementations, the host system 110A is capable of dynamically adjusting the threshold value used to compare against the consistency score. In such implementations, adjusting the threshold value allows the host system 110A to dynamically adjust the degree of speculation for the partially generated frame. In this context, the degree of speculation represents a ratio of the number of regions of the partially generated frame that are pre-rendered and the number of regions of the partially generated frame that are not generated. For example, reducing the threshold value increases the likelihood that a region will be pre-rendered in a partially generated frame, i.e., a higher degree of speculation. In contrast, increasing the threshold value reduces the likelihood that a region will be pre-rendered in the partially generated frame, i.e., a lower degree of speculation.

Alternatively, in some implementations, prioritization scores (which can be a combination of probability, consistency, and possibly other information like data size) may be used to determine how much network bandwidth may be dedicated to transmitting a partial frame or how much space in the database 140 may be allocated to it. If a bandwidth limit is reached, or the database 140 has reached capacity, then a lower priority partial frame may not be sent, resulting in gaps in the representations of partial frames. For example, the representations of partial frames can include an intermediate data structure prior to rendering/assembly of a frame based on how probabilities change as time of the partial frame approaches.

Figure 8:
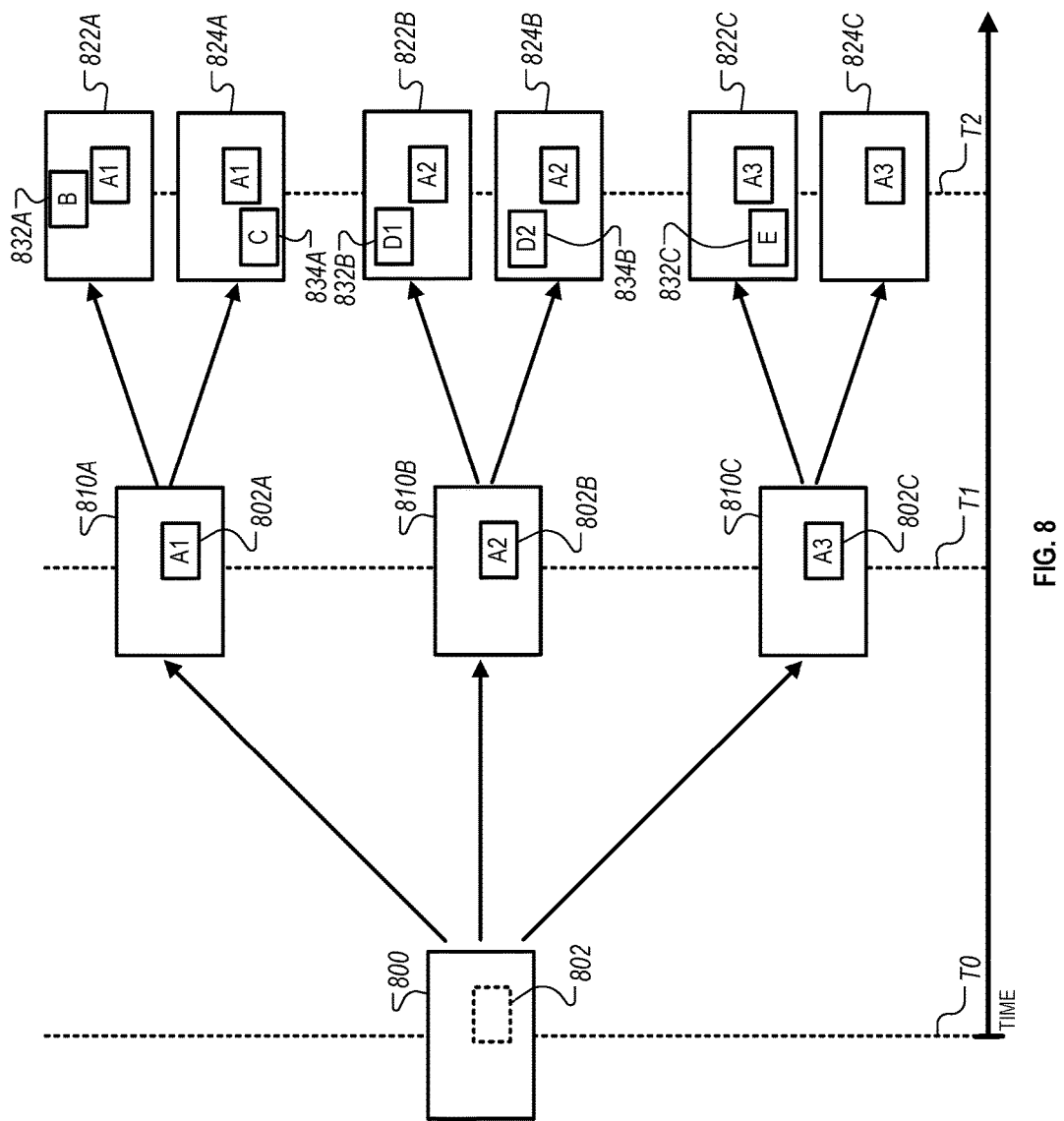
FIG. 8 illustrates examples of alternative frame sequences that can be generated over time based on rendering and combining different partial frames.

FIG. 8 illustrates examples of alternative frame sequences that can be generated over time based on rendering and combining different partial frames. In this example, each sequence of frames includes frames that are displayed at three distinct time points T0, T1, and T2, where T0 precedes T1, and T1 precedes T2. Each frame distinct sequence, in this example, is used to represent different types of visual changes in VR content as discussed throughout this document. For example, a frame sequence that includes frames 800, 810A, and 822A can represent a first frame sequence that is predicted by the system based on one type of user input received at time point T0, whereas a frame sequence that includes frames 800, 810B, and 822B can represent a second frame sequence that is predicted by the system based on a second type of user input received at time point T0. In this example, the system uses the different user inputs to generate different frame sequences using different combinations of partial frames to represent the different changes in the display of VR content in response to the different user inputs.

The alternative frame sequences depicted in FIG. 8 can be generated using different types of alternative frame generation techniques. For example, frames 810A, 810B, and 810C represent alternative frames because they are each rendered using a different partial frame, e.g., partial frames 802A, 802B, and 802C. In this example, partial frames 802A-C can represent alternative partial frames used for alternative predicted changes at time point T0 for region 802 of the frame 800.

As another example, frames 822A and 824A represent alternative frames because they are each rendered using different partial frames, e.g., partial frames 832A and 834A, that are inserted into different regions of the frame 810A. In this example, partial frames 802A-C can represent different types of predicted changes at time point T1 corresponding to different regions of the frame 810A.

As yet another example, the frames 822B and 824B represent alternative frames because they are each rendered using a different partial frame that are alternatives of one another, e.g., partial frames 832B and 834B, in a manner that is similar to the generation of frames 810A-C discussed above.

In yet another example, frames 822C and 824C represent alternative frames because while frame 822C is rendered using a partial frame 832C, frame 824C is left unchanged relative to frame 810C. In this example, the frame 822C is rendered if a predicted change is determined at time point T1 to a region within the frame 810C that corresponds to the partial frame 832C. Alternatively, if no change is predicted, then frame 810C is left unchanged and frame 824C is rendered at time point T2 (which is displayed as an identical frame to the frame 810C rendered at time point T1).

In some implementations, frame prediction and/or speculation may extend multiple time points into the future, e.g., time points T0, T1, and T3. In such implementations, for a given frame that is actually rendered, the system may generate multiple possible successors, e.g., frames 810A, 810B, and 810C, each with a respective probability, e.g., a prioritization score representing a likelihood of occurrence, and/or a distribution of probabilities for regions assembled from stored partial frames. Since there will typically be substantial similarity and overlap between different possible future frames, e.g., frames 810A-C share the same regions of frame 800 that do not include region 802, substantial bandwidth can be saved by encoding common portions only once. Moreover, distortions can be specified hierarchically and/or compositionally. For example, a large region of overlap between alternative frames would first be specified in terms of a single set of references to stored partial frames and distortions, and then additional large-scale transformations can be specified to represent how the common region will appear in each of the alternatives.

Figure 9:
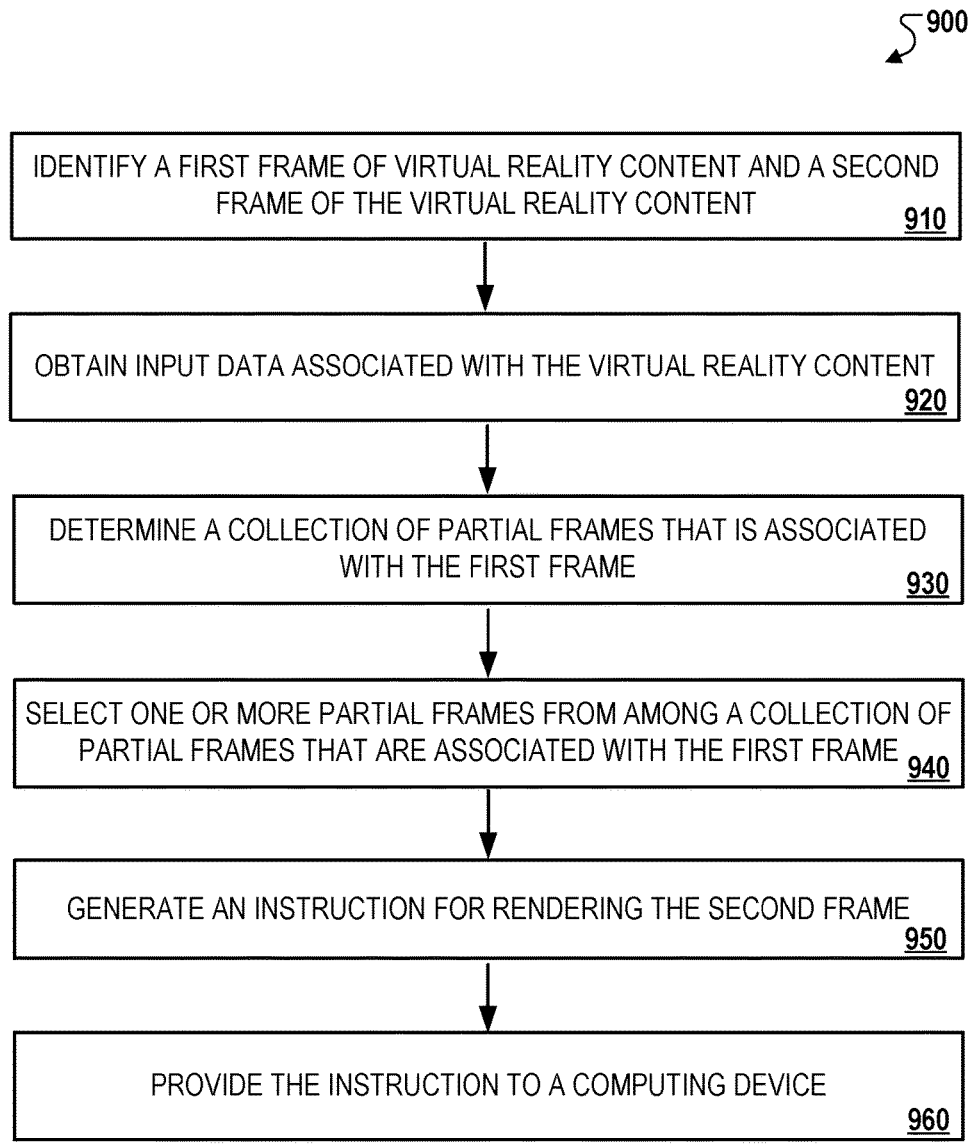
FIG. 9 illustrates an example of a process for generating an instruction to render a frame of VR content that is streamed on a computing device.

FIG. 9 illustrates an example of a process 900 for generating an instruction to render a frame of VR content that is streamed on a computing device. Briefly, the process 900 can include identifying a first frame of virtual reality content and a second frame of the virtual reality content (910), obtaining input data associated with the virtual reality content (920), determining a collection of partial frames that is associated with the first frame (930), selecting one or more partial frames from among a collection of partial frames that are associated with the first frame (940), generating an instruction for rendering the second frame (950), and providing the instruction to a computing device (960).

In general, the process 900 is described in reference to system 200, although any content management system can be capable of performing the operations discussed in detail below. In one example, the operations of the process 900 are performed by a host system within the host system network 110, such as the host system 110A. In this example, a rendering instruction is provided to a computing device, such as one of the computing devices 120a-c, that streams VR content running locally on the host system 110A. In another example, the operations of the process 900 are performed by a configuration server that is logically and/or physically distinct from the host system network 110, such as the configuration server 130. In this example, the configuration server 130 generates the rendering instruction based on monitoring data transmissions between the host system 110A and the computing devices 120a-c.

In more detail, the process 900 can include the operation of identifying a first frame of virtual reality content and a second frame of the virtual reality content (910). For example, as shown in FIG. 1C, the host system 110A and/or the configuration server 130 can identify a first frame 102a of VR content that has been provided to the computing device 120. The host system 110A and/or the configuration server 130 can also identify a second frame 102b that is to be rendered for display on the computing device 120. In this example, the first and second frames 102a and 102b can be consecutive frames within a frame sequence of the VR content, or alternatively, non-consecutive frames, e.g., the first frame 102a precedes the second frame 102b by one or more intermediate frames.

As discussed above, the VR content can include different types of digital data that are displayed or otherwise accessed by a user through a standalone HMD, e.g., an HMD with a dedicated display screen, or an HMD attached to the computing device 120, e.g., a HMD that uses the display screen of the computing device 120. For example, the VR content can include different types of visual content such as video or images. Additionally, the VR content can have different formats. For example, the VR content can be a two-dimensional video composed of rectangular pixels such as a video file that is displayed on a display screen. Alternatively, the VR content can be a three-dimensional video, e.g., a 360-degree video, that has non-rectangular pixels, such as a video file displayed as 3D SBS format.

The process 900 can include the operation of obtaining input data associated with the virtual reality content (920). For example, as shown in FIG. 1C, the host system 110A and/or the configuration server 130 can obtain input data associated with the VR content streamed on the computing device 120. As discussed above, the user input data can identify a user input provided by a user of the computing device 120 before or while the first frame 102a is displayed on the computing device 120. In the example depicted in FIG. 1C, the input data specifies a user-specified button press for the left button, which then corresponds to a movement of a displayed character within the first frame 102a towards the left side of the first frame 102a.

The process 900 can include the operation of determining a collection of partial frames that are associated with the first frame (930). As discussed above, the host system 110A and/or the configuration server 130 can determine the collection of partial frames at different time points. In some implementations, the collection of partial frames is determined before the VR content is accessed on the computing device 120, e.g., as an offline process before the user access the VR content on the computing device 120. For example, the host system 110A and/or the configuration server 130 can determine the collection of partial frames based on frames of the VR content previously provided to the computing device 120 and/or frames of the VR content previously provided to other computing devices that have accessed the VR content. In other implementations, the collection of partial frames is determined while the VR content is accessed on the computing device 120, e.g., during a loading screen, or another time period when there is limited processing activity taking place on the computing device 120. For example, the host system 110A and/or the configuration server 130 can determine the collection of partial frames that are relevant for a particular scene about to be displayed.

In some implementations, the host system 110A and/or the configuration server 130 determines the collection of partial frames that are relevant incrementally as network bandwidth budget and database free space permit. Alternatively, this determination can be based on values of prioritization scores discussed above. For example, a priority score may be based on probability that a frame will appear, the consistency with which a partial frame appears in different alternative predicted partial frames, and some measure(s) of cost. For instance, partial frames already sent to the computing device 120 can have a zero bandwidth cost, but can also have a database space cost. Predictive partial frames can have both database space cost and also an opportunity cost in terms of the potential for visual lag when a given partial frame ends up being needed but was not sent to the computing device 120 ahead of time. In this regard, the system is capable of relating the costs of sending particular partial frames against other bandwidth costs in order to rationally decide what partial frames to send during display of VR content and how far in advance to send them.

In some implementations, the collection of partial frames includes partial frames representing previous changes to the first frame 102a that were previously provided to the computing device 120. For example, the first frame 102a can represent a menu that a user interacts during or prior to accessing the VR content. In this example, changes between consecutive frames of a frame sequence for the menu are identified, e.g., changes in the menu display based on user selection of menu items. The system then generates partial frames representing regions of frames corresponding to the identified changes. The generated partial frames can then be stored as the collection of partial frames as referenced in steps 930 and 940. As discussed above, the collection of partial frames can be stored on a server system only, such as the host system 110A or the configuration server 130, or alternatively, on both the server system and the computing device 120.

In some other implementations, the collection of partial frames represents predicted changes to the first frame 102a based on a set of possible user actions that can be performed during or after the display of the first frame 102a. In such implementations, the system determines a set of possible user actions, e.g., user inputs that result will result some type change to one or more regions of the first frame 102a. For example, a user input that changes the camera of a game results in a partial change to the current field of view between frames. The system identifies an expected change to a particular region of the first frame 102a for each possible action within the set of possible actions, as depicted in FIG. 1B. The system then generates partial frames for the expected changes to the particular regions of the first frame 102a. As discussed above, the generated partial frames can then be stored as than the collection of partial frames in a server system, or alternatively, on the server system and the computing device 120.

Additionally, the collection of partial frames can include partial frames that are obtained from different sources of information. For example, the collection of partial frames includes partial frames representing portions of frames previously provided to the computing device 120, e.g., detected changes to the first frame 102a when previously displayed on the computing device 120. In another example, the collection of partial frames includes partial frames representing portions of frames previously provided to other computing devices that have accessed the VR content, e.g., detected changes to the first frame 102a when previously displayed on other computing devices that have access to the same VR content as the computing device 120. In yet another example, the collection of partial frames includes partial frames representing portions of frames not previously provided to the computing device but are predicted to likely to be subsequently displayed on the computing device, e.g., predicted changes to the first frame 102a based on user input provided by the user of the computing device 120.

The process 900 can include the operation of selecting one or more partial frames from among a collection of partial frames that are associated with the first frame (940). The host system 110A and/or the configuration server 130 selects one or more partial frames from among the collection of partial frames that are associated with the first frame 102a. The selection can be based on the input data received in step 920. For example, as depicted in FIG. 1C, the partial frame 132b is selected from the database 140 based on the input data indicating a left button press on the computing device 120. In this example, the user input data is used to predict that a character is likely to move toward the to the left of the position of the character in the first frame 102a, which is then used to select the partial frame 132b where the character is placed in the predicted position in the second frame 102b.

The process 900 can include the operation of generating an instruction for rendering the second frame (950). The host system 110A and/or the configuration server 130 generates an instruction for rendering the second frame 102b. The instruction can include a representation of the difference between a corresponding portion of the first frame 102a and each of the partial frames selected in step 940. The representation of the difference can specify, for example, a transformation between a portion of the first frame 102a and a partial frame that enables the rendering engine 122 to render the second frame 102b by combining the first frame 102a and one or more of the partial frames selected in step 940.

The process 900 can include the operation of providing the instruction to a computing device (960). The host system 110A and/or the configuration server 130 provides the instruction to the computing device 120. For example, as depicted in FIG. 1A, the host system 110A provides the rendering instruction 109 to the computing device 120 over the network 105.

In some implementations, the collection of partial frames is stored on a server system such as the host system 110A and/or the configuration server 130. For example, as depicted in FIG. 4B, partial frames can be stored in a database 140 associated with the host system 110A. In such implementations, the instruction generated in step 940 further includes the partial frames selected in step 920. The generated instruction also includes one or more commands that are executed when the instruction is received by the computing device 120. For example, the one or more commands can cause the computing device 120 to combine the first frame 102a and the selected partial frames using the representations to render the second frame 102b.

Alternatively, in other implementations, the collection of partial frames is stored locally on a computing device such as the computing device 120. For example, as depicted in FIG. 4C, partial frames can be pre-fetched during or before a streaming session involving the VR content is initiated on the computing device 120. In such implementations, the instruction generated in step 940 further includes metadata that identifies the partial frames selected in step 920 (as opposed to including packets for the partial frames to reduce the required network bandwidth to transmit the instruction). The generated instruction also includes one or more commands that are executed when the instruction is received by the computing device 120. For example, the one or more commands can cause the computing device 120 to obtain the selected partial frames from storage using the metadata, and combine the first frame 102a and the selected partial frames using the representations to render the second frame 102b.

In some implementations, the selection of partial frames in step 920 includes performing additional operations such as computing prioritization scores for partial frames included in the collection of partial frames. For example, the prioritization scores can each represent a predicted likelihood that a particular partial frame will be displayed to the user as depicted in FIGS. 5-7. In such implementations, selected partial frames are the partial frames that have a prioritization score that satisfies a predetermined threshold or does not exceed a bandwidth limit. For example, as shown in FIG. 7, partial frames that have a prioritization score that satisfies the predetermined threshold represent partial frames that have a sufficiently high likelihood of occurring in the VR content at some point after the first frame 102a is provided to the computing device 120.

In some implementations, each partial frame within the collection of partial frames represents a predicted change to a portion of the first frame 102a. As discussed above, examples of such changes can include a movement of a displayed object within the first frame 102a based on user input provided by the user, a change in the appearance of a displayed object within the first frame 102a, or an appearance/disappearance of a displayed object within the first frame 102a in relation to a preceding or subsequent frame.

In some implementations, the input data received in step 920 identifies a type of input provided by a user of the computing device 120, e.g., a movement to a displayed object, a user selection of a menu item, an action that changes the appearance of a displayed object, a change to the displayed field of view, etc. In such implementations, the selection of the one or more partial frames in step 940 includes selecting partial frames that each represent a predicted change corresponding to the type of input provided by the user of the computing device 120. For example, the partial frames within the collection of partial frames can each be assigned to user input types such that a specified type of input identified by the input data can be used to filter the collection of partial frames and select the partial frames that represent a predicted change for the specified type of input.

In some implementations, the input data received in step 920 identifies a display element of the first frame 102a that is impacted by a user input, e.g., a crosshair that is moved across the screen based on a user input, a menu button that is selected by a user input, etc. In such implementations, the selection of the one or more partial frames in step 940 includes selecting partial frames that are each assigned to the display element identified in the input data. For example, the partial frames within the collection of partial frames can each be assigned to different display elements such that a specified display element can be used to filter the collection of partial frames and select the partial frames that are assigned to the specified display element.

In some implementations, the process 900 can include the following additional operations such as encoding the one or more partial frames selected in step 920 to generate encoded partial frames. For example, as depicted in FIG. 1A, selected partial frames 106 can be encoded by the encoding engine 116 of the host system 110A to generate the encoded video 108. In this example, the instruction generated and provided to the computing device 120 in steps 950 and 960 include the encoded video 108 that is then rendered locally on the computing device 120 by the rendering engine 122. The instruction also includes one or more commands that are executed when the instruction is received by the computing device 120. For example, the one or more commands can cause the rendering engine 122 to combine the encoded video 108 and the first frame 102a using the representations to render the second frame 102b.

The systems and techniques discussed above can include various features that improve the performance of operations within the process 900, such as the generation of partial frames, the selection of partial frames that are relevant to a frame to be rendered, and/or the rendering of partial frames to generate a fully-assembled frame to be provided for display on the computing device. In some implementations, the operations discussed above can be performed based on knowledge of a present application state when VR content is displayed to the user. For example, if the application state indicates that the user is interacting with a menu, then input latency may not be a high priority and so the operations discussed above can be performed to preserve computational and/or graphical resources. Alternatively, if the application state indicates that the user is participating in an interactive game, then input latency may be a high priority and so the operations discussed above can be performed in a manner that takes advantage of network bandwidth to the fullest extent possible.

In some implementations, the systems discussed above include an event triggering system that initiates the performance of one or more of the operations discussed above with respect to the process 900. For example, the systems may incorporate a rule-based engine that applies rules specifying triggers and/or conditions for specified events, and system actions to be performed in response to satisfaction of the triggers and/or conditions. For example, an event can refer to receiving a specific type of input indicating that a user has entered a gaming session, which is then used to adjust the operations performed so that reduction of input latency is prioritized over graphics fidelity of the frames that are displayed on the computing device 120. Another example is user input such as a hot key triggering the appearance of a menu. This can be handled autonomously by the computing device 120.

Figure 10:
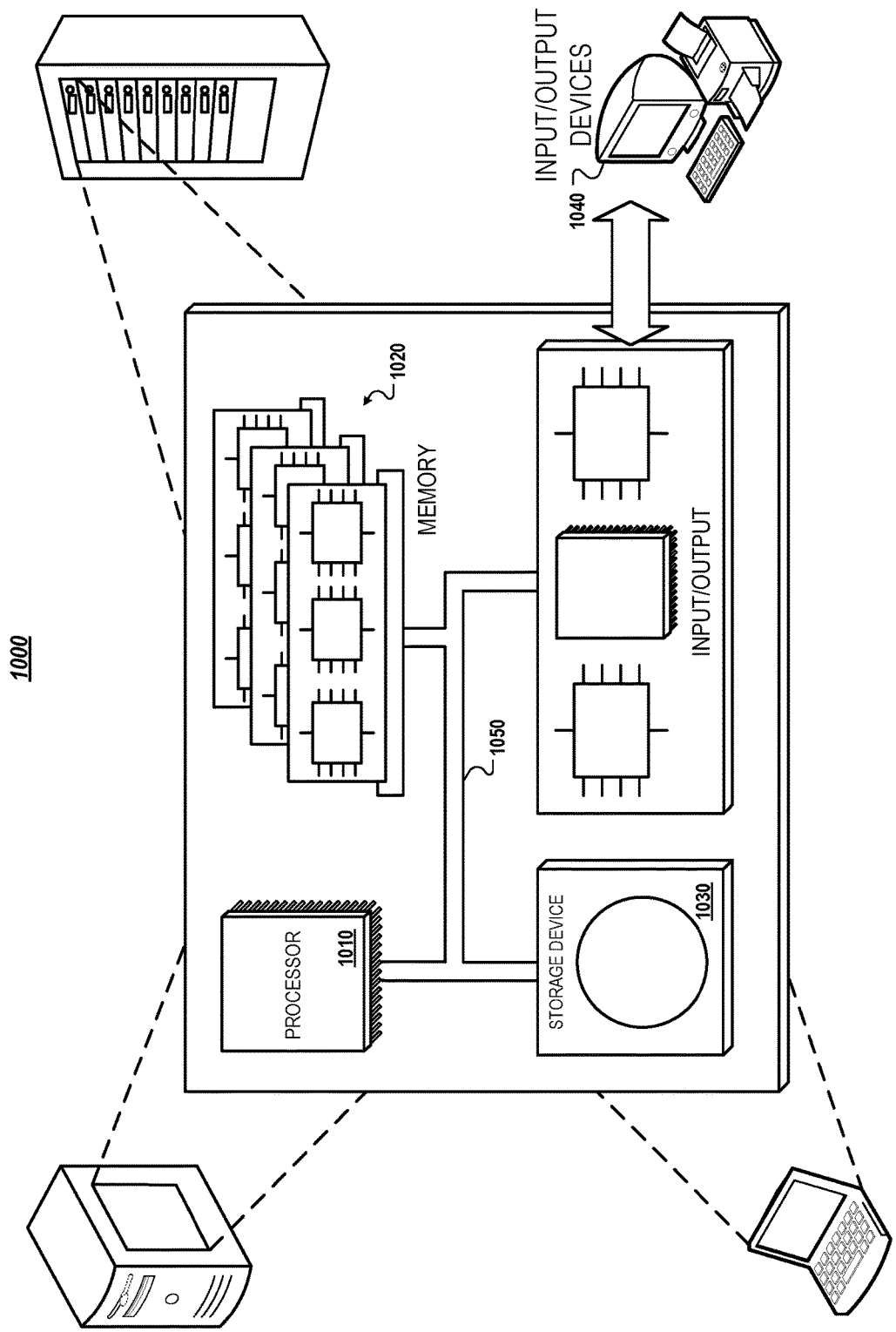
FIG. 10 illustrates a block diagram of computing devices on which the processes described herein, or potions thereof, may be implemented.

FIG. 10 is a schematic diagram of an example of a generic computer system 1000. The system 1000 can be used for the operations described in association with the figures discussed above according to some implementations. The system 1000 may be included in the systems 100 and 200.

The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In one implementation, the memory 1020 is a computer-readable medium. In one implementation, the memory 1020 is a volatile memory unit. In another implementation, the memory 1020 is a non-volatile memory unit.

The memory 1020 stores information within the system 1000. In one implementation, the memory 1020 is a computer-readable medium. In one implementation, the memory 1020 is a volatile memory unit. In another implementation, the memory 1020 is a non-volatile memory unit.

The storage device 1030 is capable of providing mass storage for the system 1000. In one implementation, the storage device 1030 is a computer-readable medium. In various different implementations, the storage device 1030 may be a floppy disk device, a hard disk device, an optical disk device, or a tape device.

The input/output device 1040 provides input/output operations for the system 1000. In one implementation, the input/output device 1040 includes a keyboard and/or pointing device. In another implementation, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:

providing, by a server system and to a computing device, partial frames that are associated with virtual reality content, wherein the partial frames, when received by the computing device, are stored in a computer-readable storage medium of the computing device as a collection of pre-fetched partial frames;

after providing the partial frames to the computing device, receiving, by the server system and from the computing device, a request to stream the virtual reality content;

identifying, by the server system, (i) a first frame of the virtual reality content that has been provided to a computing device based on receiving the request to stream the virtual reality content, and (ii) a second frame of the virtual reality content to be rendered for display on the computing device;

obtaining, by the server system, input data associated with the virtual reality content streamed on the computing device;

providing, by the server system, data indicating the collection of pre-fetched partial frames to a model that is trained to output, for each of different partial frames of the virtual reality content, a prioritization score that indicates a likelihood that a partial frame will occur within the second frame based on the first frame of the virtual content;

receiving, by the server system and from the model, data indicating prioritization scores computed by the model for the collection of pre-fetched partial frames;

selecting, by the server system and based at least on the obtained input data and the prioritization scores computed by the model for the collection of pre-fetched partial frames, one or more pre-fetched partial frames from among the collection of pre-fetched partial frames that are each associated with the first frame; and generating, by the server system, an instruction for the computing device to render the second frame, the instruction including at least, for each of the selected pre-fetched partial frames, a representation of the difference between a corresponding portion of the first frame and a particular pre-fetched partial frame; and providing, by the server system, the instruction to the computing device that, when received by the computing device, causes the computing device to render the second frame on the computing device based on the representation of the difference.

2. The method of claim 1, wherein:

the instruction further includes, (i) metadata that identifies the selected pre-fetched partial frames, and (ii) one or more commands that, when the instruction is received by the computing device, causes the computing device to:
   obtain the selected pre-fetched partial frames from storage based on the metadata,
   combine the first frame and the selected pre-fetched partial frames using the representations, and
   render the second frame based on combining the first frame and the selected pre-fetched partial frames.

3. The method of claim 1, wherein:

the obtained user input data identifies a type of input provided by a user of the computing device; and selecting the one or more pre-fetched partial frames from among the collection of pre-fetched partial frames comprises selecting one or more pre-fetched partial frames that each represent a predicted change corresponding to the type of input provided by the user of the computing device.

4. The method of claim 1, wherein:
the obtained user input data identifies a display element of the first frame; and
selecting the one or more pre-fetched partial frames from among the collection of pre-fetched partial frames comprises selecting one or more pre-fetched partial frames that are assigned to the display element.

5. The method of claim 1, wherein the virtual reality content comprises a two-dimensional video composed of rectangular pixels.

6. The method of claim 1, wherein the virtual reality content comprises a three-dimensional video composed of non-rectangular pixels.

7. The method of claim 1, wherein the collection of pre-fetched partial frames comprises at least one of (i) pre-fetched partial frames representing portions of frames of the virtual reality content previously provided to the computing device, (ii) pre-fetched partial frames representing portions of frames of the virtual reality content previously provided to other computing devices that have accessed the virtual reality content, or (iii) pre-fetched partial frames representing portions of frames of the virtual reality content not previously provided to the computing device but are predicted to likely to be subsequently displayed on the computing device.

8. The method of claim 1, wherein identifying a collection of pre-fetched partial frames that is associated with the first frame comprises:
obtaining data indicating a particular sequence of frames that were previously provided to the computing device;
identifying changes between consecutive frames within the particular sequence of frames;
generating pre-fetched partial frames representing regions of frames corresponding to the identified changes; and
storing the generated pre-fetched partial frames.

9. The method of claim 1, wherein identifying a collection of pre-fetched partial frames that is associated with the first frame comprises:
determining a set of possible user actions that can be performed while accessing the virtual reality content on the computing device;
identifying, for each possible action within the set of possible user actions, an expected change to a particular region of the first frame; and
generating the pre-fetched partial frames for the expected changes to the particular regions of the first frame.

10. A system comprising:
one or more computers; and
one or more storage devices storing instructions that, when executed by the one or more computers, cause the one or more computers to perform operations comprising:
providing, by a server system and to a computing device, partial frames that are associated with virtual reality content, wherein the partial frames, when received by the computing device, are stored in a computer-readable storage medium of the computing device as a collection of pre-fetched partial frames;
after providing the partial frames to the computing device, receiving, by the server system and from the computing device, a request to stream the virtual reality content;
identifying, by the server system, (i) a first frame of the virtual reality content that has been provided to a computing device based on receiving the request to stream the virtual reality content, and (ii) a second frame of the virtual reality content to be rendered for display on the computing device;
obtaining, by the server system, input data associated with the virtual reality content streamed on the computing device;
providing, by the server system, data indicating the collection of pre-fetched partial frames to a model that is trained to output, for each of different partial frames of the virtual reality content, a prioritization score that indicates a likelihood that a partial frame will occur within the second frame based on the first frame of the virtual content;
receiving, by the server system and from the model, data indicating prioritization scores computed by the model for the collection of pre-fetched partial frames;
selecting, by the server system and based at least on the obtained input data and the prioritization scores computed by the model for the collection of pre-fetched partial frames, one or more pre-fetched partial frames from among the collection of pre-fetched partial frames that are each associated with the first frame; and
generating, by the server system, an instruction for the computing device to render the second frame, the instruction including at least, for each of the selected pre-fetched partial frames, a representation of the difference between a corresponding portion of the first frame and a particular pre-fetched partial frame; and
providing, by the server system, the instruction to the computing device that, when received by the computing device, causes the computing device to render the second frame on the computing device based on the representation of the difference.

11. The system of claim 10, wherein:
the instruction further includes, (i) metadata that identifies the selected pre-fetched partial frames, and (ii) one or more commands that, when the instruction is received by the computing device, causes the computing device to:
obtain the selected pre-fetched partial frames from storage using the metadata, and
combine the first frame and the selected pre-fetched partial frames using the representations to render the second frame.

12. A non-transitory computer-readable storage device encoded with computer program instructions that, when executed by one or more computers, cause the one or more computers to perform operations comprising:
providing, by a server system and to a computing device, partial frames that are associated with virtual reality content, wherein the partial frames, when received by the computing device, are stored in a computer-readable storage medium of the computing device as a collection of pre-fetched partial frames;
after providing the partial frames to the computing device, receiving, by the server system and from the computing device, a request to stream the virtual reality content;
identifying, by the server system, (i) a first frame of the virtual reality content that has been provided to a computing device based on receiving the request to stream the virtual reality content, and (ii) a second frame of the virtual reality content to be rendered for display on the computing device;

obtaining, by the server system, input data associated with the virtual reality content streamed on the computing device;

providing, by the server system, data indicating the collection of pre-fetched partial frames to a model that is trained to output, for each of different partial frames of the virtual reality content, a prioritization score that indicates a likelihood that a partial frame will occur within the second frame based on the first frame of the virtual content;

receiving, by the server system and from the model, data indicating prioritization scores computed by the model for the collection of pre-fetched partial frames;

selecting, by the server system and based at least on the obtained input data and the prioritization scores computed by the model for the collection of pre-fetched partial frames, one or more pre-fetched partial frames from among the collection of pre-fetched partial frames that are each associated with the first frame; and generating, by the server system, an instruction for the computing device to render the second frame, the instruction including at least, for each of the selected pre-fetched partial frames, a representation of the difference between a corresponding portion of the first frame and a particular pre-fetched partial frame; and providing, by the server system, the instruction to the computing device that, when received by the computing device, causes the computing device to render the second frame on the computing device based on the representation of the difference.

13. The device of claim 12, wherein:

the instruction further includes, (i) metadata that identifies the selected pre-fetched partial frames, and (ii) one or more commands that, when the instruction is received by the computing device, causes the computing device to:

obtain the selected pre-fetched partial frames from storage using the metadata, and combine the first frame and the selected pre-fetched partial frames using the representations to render the second frame.

* * * * *